United States Patent
Brkic et al.

(10) Patent No.: US 11,055,904 B2
(45) Date of Patent: Jul. 6, 2021

(54) OPTIMIZING DEPTH TESTING IN GRAPHICS PROCESSING SYSTEMS THAT PERFORM EARLY AND LATE DEPTH TESTING

(71) Applicant: Arm Limited, Cambridge (GB)

(72) Inventors: Toni Viki Brkic, Staffanstorp (SE); Reimar Gisbert Doffinger, Lund (SE); Jakob Axel Fries, Malmo (SE); Sven Uwe Deidersen, Lund (SE)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 16/552,500

(22) Filed: Aug. 27, 2019

(65) Prior Publication Data
US 2021/0065437 A1 Mar. 4, 2021

(51) Int. Cl.
*G06T 15/40* (2011.01)
*G06T 15/00* (2011.01)

(52) U.S. Cl.
CPC ......... *G06T 15/405* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 9,153,070 B2 | 10/2015 | Nystad | |
| 9,454,844 B2 | 9/2016 | Doffinger | |
| 9,552,665 B2* | 1/2017 | Heggelund | ............. G06T 11/40 |
| 10,311,016 B2 | 6/2019 | Heggelund | |
| 10,438,314 B2* | 10/2019 | Hakura | ................. G06T 15/503 |
| 2003/0080957 A1 | 5/2003 | Stewart | |
| 2003/0151606 A1 | 8/2003 | Morein | |
| 2007/0291030 A1* | 12/2007 | Fowler | .................. G06T 15/405 345/422 |
| 2014/0168220 A1 | 6/2014 | Nystad | |
| 2014/0354654 A1 | 12/2014 | Heggelund | |
| 2014/0375637 A1 | 12/2014 | Heggelund | |
| 2015/0097831 A1 | 4/2015 | Doffinger | |
| 2015/0130798 A1 | 5/2015 | Heggelund | |
| 2017/0272722 A1 | 9/2017 | Salvi | |
| 2018/0108167 A1 | 4/2018 | Nystad | |
| 2018/0218532 A1* | 8/2018 | Pillai | ....................... G06T 15/40 |

* cited by examiner

*Primary Examiner* — Hilina K Demeter
(74) *Attorney, Agent, or Firm* — Vierra Magen Marcus LLP

(57) ABSTRACT

A graphics processor includes a rasteriser, an early depth tester, a renderer, a late depth tester, and a depth test data buffer that stores depth data values for use by the early and late depth testers. When a fragment is to undergo an early depth test to update the depth buffer, it is first determined whether the fragment should undergo the early depth test to update the depth buffer without waiting for any other fragment to undergo a depth test, or whether the result of a late depth test on a fragment that is still to undergo a late depth test should be awaited before performing a depth test to update the depth buffer on the fragment.

21 Claims, 5 Drawing Sheets

OPTIMIZING DEPTH TESTING IN GRAPHICS PROCESSING SYSTEMS THAT PERFORM EARLY AND LATE DEPTH TESTING

BACKGROUND

The technology described herein relates to the processing of computer graphics, and in particular to depth-testing in graphics processing.

Graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve performing fragment shading, applying textures, blending sample point data values, etc.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(Correspondingly, each graphics fragment may typically be the same size and location as a "pixel" of the output (e.g. output frame), but it can be the case that there is not a one-to-one correspondence between a fragment and a display pixel, for example where particular forms of post-processing, such as downsampling, are carried out on the rendered image prior to displaying the final image.)

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater).

The problem of "overdraw" could be significantly reduced by sending primitives for rendering in front-to-back order. However, other graphics processing requirements, such as the need for coherent access to resources such as textures, and the need to minimise the number of API calls per frame, generally mandate other preferred ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of other techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

One such technique is to carry out depth (Z) testing as a form of hidden surface removal before a primitive and/or fragment is sent for rendering, to see if the primitive or fragment, etc. will be obscured by a primitive that has already been rendered (in which case the new fragment and/or primitive need not be rendered). Such so-called "early" Z (depth) testing processes are in addition to any "late" hidden surface removal, such as late depth testing, that will take place after the rendering process.

These arrangements try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) depth testing arrangements can still suffer from inefficiencies.

For example, if a later graphics fragment for a given sampling position in the render output being generated is subjected to an early depth-test and causes the depth buffer value for the sampling position in question to be updated (changed), that could lead to an earlier graphics fragment (that is already being processed) for that sampling position in the render output incorrectly failing a later depth test that it undergoes, thereby potentially leading to an error in the render output.

For example, considering the situation where the depth buffer has an initial value of 5 for a given fragment position and a fragment for that position having a depth value of 4 that is to undergo a late depth test and that writes colour is followed by a fragment with a depth value of 3 that is to undergo an early depth test, then the correct result of processing those fragments in their correct order, assuming a "less than" depth comparison, will be that the first fragment with a depth of 4 will pass the depth test, and so write out its colour values for its position and update the depth buffer to a value of 4, with the later fragment having a depth value of 3 then undergoing its depth test to update the depth buffer to 3.

On the other hand, if the fragment with a depth of 3 that is to undergo the early depth test were to undergo that early depth test before the earlier fragment with the depth of 4 undergoes its late depth test, then the early depth test of the later fragment will update the value in the depth buffer to 3 (assuming a "less than" depth comparison) before the earlier fragment with the depth of 4 undergoes its late depth test, such that when the earlier fragment with a depth value of 4 then undergoes its late depth test, it will fail that depth test (again assuming a "less than" depth comparison), and so will be discarded, and will not write out its colour values for the fragment position in question. The result of depth-testing the fragments "out-of-order" will thus be incorrect (will not match the (correct) result when the fragments are processed in the correct order).

In order to avoid such rendering errors, it is accordingly desirable to ensure that fragments are still processed (and in particular depth-tested) in the correct rendering order when using early depth-testing. The correct testing order can be enforced, for example, by stalling a later graphics fragment at the early depth test stage until any earlier graphics fragment or fragments that the later fragment is dependent on have completed their processing, or the early depth test could be skipped for any later graphics fragment that has a dependency on an earlier graphics fragment or fragments, with the later fragment simply being issued to the rendering pipeline regardless (and then tested at a "late" depth test stage when it reaches the end of the rendering pipeline).

However, both of these arrangements can lead to inefficiencies. For example, in the former case, there may be a delay in processing and throughput of the graphics fragments. In the latter case, there is a risk that graphics fragments that would in fact have been occluded will be issued to the rendering pipeline and processed.

The Applicants believe therefore that there remains scope for improved techniques for depth testing in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
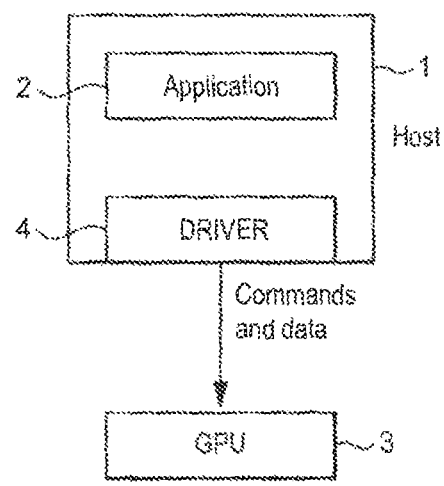
FIG. 1 shows an exemplary graphics processing system.

A first embodiment of the technology described herein comprises a method of operating a graphics processor that includes:
  a rasteriser circuit configured to rasterise input primitives to generate graphics fragments to be processed, each graphics fragment having one or more sampling positions associated with it;
  a renderer circuit configured to process fragments generated by the rasteriser to generate output fragment data;
  an early depth test circuit configured to perform an early depth test on fragments generated by the rasteriser before the fragments are sent to renderer for processing;
  a late depth test circuit configured to perform a late depth test on fragments that have been processed by the renderer before the fragments are output by the renderer to provide output fragment data for sampling positions associated with the fragments; and
  a depth buffer configured to store depth data values for use by the early and late depth tests;
  the method comprising:
  for a fragment generated by the rasteriser that is to undergo an early depth test and that will update the depth buffer if it passes the early depth test:
  determining whether the fragment should undergo the early depth test to update the depth buffer without waiting for any other fragment to undergo a depth test, or whether the result of a late depth test on a fragment that is still to undergo a late depth test should be awaited before performing a depth test to update the depth buffer on the fragment; and
  when it is determined that the fragment should undergo the early depth test to update the depth buffer without waiting for any other fragment to undergo a depth test, performing the early depth test to update the depth buffer for the fragment and when the fragment passes that early depth test, updating the depth buffer with depth data for the fragment, and when the fragment fails that early depth test, not updating the depth buffer with depth data for the fragment; and
  when it is determined that the result of a late depth test on a fragment that is still to undergo a late depth test should be awaited before performing a depth test to update the depth buffer on the fragment, only performing a depth test to update the depth buffer for the fragment once the fragment that is still to undergo a late depth test has completed its late depth test.

A second embodiment of the technology described herein comprises a graphics processor, the graphics processor comprising:
  a rasteriser circuit configured to rasterise input primitives to generate graphics fragments to be processed, each graphics fragment having one or more sampling positions associated with it;
  a renderer circuit configured to process fragments generated by the rasteriser to generate output fragment data;

an early depth test circuit configured to perform an early depth test on fragments generated by the rasteriser before the fragments are sent to renderer for processing;

a late depth test circuit configured to perform a late depth test on fragments that have been processed by the renderer before the fragments are output by the renderer to provide output fragment data for sampling positions associated with the fragments; and a depth buffer configured to store depth data values for use by the early and late depth tests;

wherein the early depth test circuit is further configured to:

for a fragment generated by the rasteriser that is to undergo an early depth test and that will update the depth buffer if it passes the early depth test:

determine whether the fragment should undergo the early depth test to update the depth buffer without waiting for any other fragment to undergo a depth test, or whether the result of a late depth test on a fragment that is still to undergo a late depth test should be awaited before performing a depth test to update the depth buffer on the fragment; and when it is determined that the fragment should undergo the early depth test to update the depth buffer without waiting for any other fragment to undergo a depth test, perform the early depth test to update the depth buffer for the fragment and when the fragment passes that early depth test, update the depth buffer with depth data for the fragment, and when the fragment fails that early depth test, not update the depth buffer with depth data for the fragment;

and wherein the graphics processor is further configured to:

when it is determined that the result of a late depth test on a fragment that is still to undergo a late depth test should be awaited before performing a depth test to update the depth buffer on the fragment, only perform a depth test to update the depth buffer for the fragment once the fragment that is still to undergo a late depth test has completed its late depth test.

The graphics processor of the technology described herein includes both an early depth test, before the renderer of the graphics processor, and a late depth test, after the renderer of the graphics processor. Both of these depth tests use a "depth" buffer that stores appropriate depth test data for use by the depth tests.

In the technology described herein, when a fragment is to undergo an early depth test that will, if passed, update the depth buffer, it is determined whether the fragment should undergo the early depth test that will (potentially) update the depth buffer without waiting for any other fragment to undergo a depth test, or whether the fragment should wait for a fragment that has still to undergo a late depth test to complete that late depth test before undergoing a depth test to (potentially) update the depth buffer. The fragment is then, accordingly, either subjected immediately to the early depth test that will (potentially) update the depth buffer, or caused to wait for another fragment to undergo a late depth test before being depth tested to (potentially) update the depth buffer. As will be discussed further below, this can then allow at least certain fragments to undergo an early depth test and update the depth buffer "out of order".

As discussed above, the Applicants have recognised that it would normally be desirable to follow the correct fragment order (sequence) when performing depth tests (and in particular in the case of performing early depth tests that (have the potential to) update the depth buffer (as if the correct fragment ordering is not followed, that can lead to depth testing (and thus rendering) errors). However, as will be discussed further below, the Applicants have recognised that in certain circumstances it is not necessary to enforce the correct fragment ordering when performing an early depth test that will update the depth buffer for a fragment, such that, in that case, the fragment can be subjected to an early depth test that will update the depth buffer "out of order", and in particular can be used to update the depth buffer "out of order".

This can then increase the overall culling rate of the depth test, since it can allow the depth buffer to be updated with more current (and thus accurate) depth values earlier (i.e. when the later fragment undergoes the early depth test, without waiting for other fragments to complete late depth tests). This should then allow more efficient culling of fragments, as they will be being tested against more up-to-date depth values in the depth buffer.

The technology described herein can thus facilitate more efficient hidden surface removal in graphics processing, even in the case where there may be, for example, order "dependencies" between fragments covering the same positions in a render output being generated.

The technology described herein can accordingly be used to more efficiently reduce the extent to which hidden surfaces are unnecessarily processed in a graphics processing pipeline, as compared, e.g., to existing early depth testing techniques.

The rasteriser of the graphics processor can be configured to operate in any suitable and desired manner, for example as in known rasterising arrangements. It should, and in an embodiment does, operate to generate graphics fragments for processing in dependence upon which sampling positions (or which sets of sampling positions) of an array of sampling positions covering the area of the output of the graphics processor a given primitive, etc., received by the rasteriser covers (at least in part). The rasteriser in an embodiment generates a graphics fragment for each sampling position covered by, and/or for each set of plural sampling positions (e.g., sampling mask) found to include a sampling position that is covered by, a (and each) primitive being rasterised.

Each fragment generated by the rasteriser may represent (have associated with it) a single sampling position, or plural sampling positions, as desired. In an embodiment, each fragment represents a set of plural, in an embodiment four (2×2), sampling positions (and thus in an embodiment corresponds to a "2×2" sampling position "quad").

In an embodiment, the rasteriser is a hierarchical rasteriser that operates to iteratively test primitives against progressively smaller patches of sampling positions down to a given, in an embodiment selected, in an embodiment predetermined, minimum patch size, discarding any patches that do not cover the primitive (at least in part), and to then generate a fragment or fragments for rendering corresponding to the patch or patches of sampling positions found to be covered at least in part by the primitive. Each patch of sampling positions that is tested in an embodiment corresponds to an integer number of fragments, such as 16×16, 8×8, 4×4 and/or 2×2 fragments.

The renderer of the graphics processor should be and is in an embodiment, operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc.

In an embodiment the renderer comprises a fragment shader (a shader pipeline) (i.e. a programmable rendering stage (circuit) that is operable to and can be programmed to carry out fragment shading programs on fragments in order to render them).

The output rendered fragment data generated by the renderer is in an embodiment written to an output buffer, such as a frame buffer, in external memory, for use (e.g. to display a frame on a display). This may be via one or more intermediate buffers, such as one or more tile buffers in the case of a tile-based graphics processor, and/or via one or more processing, e.g., down-sampling, stages (circuits), if desired.

The graphics processor of the technology described herein includes both a late depth tester and an early depth tester. These depth testers share (use in common) depth values in a depth buffer.

The depth buffer will, accordingly, and in an embodiment does, store depth data values for use (in common) by the early and late depth testers. It may comprise separate buffers that store the (same) data values for use by the early depth tester and the late depth tester, respectively, and/or there could be a (single) buffer that is used in common by both the early and late depth testers.

As well as storing, appropriate depth data values for use by the early and late depth testers, the depth buffer or buffers may also store other data, such as stencil values, if desired.

The depth buffer(s) may store the depth values for use by the early and late depth testers at any desired resolution. For example, and in an embodiment, depth values may be stored for one or more of: individual sampling positions in the render output being generated; for sets of plural sampling positions (e.g. corresponding to individual fragments) in the render output being generated; and/or for larger patches (regions) of the render output (e.g. comprising plural fragments) (for example in the case where the rasteriser is a hierarchical rasteriser as discussed above).

The depth values that are stored in the depth buffer(s) may comprise, e.g., individual (absolute) depth values, and/or ranges of values (depth value ranges), for respective render output regions (positions), as desired. In an embodiment, the depth buffer stores an individual depth value for each sampling position of a render output being generated.

The late depth tester can operate in, and carry out the late depth test in, any suitable and desired manner, e.g., in the normal manner used in the graphics processing system in question.

The late depth test in an embodiment operates per sample (and thus tests (covered) sampling positions (points) individually). Thus, it in an embodiment operates on (tests), single (covered) sampling positions that a given fragment is associated with. In this case each sampling position in an embodiment has an associated depth value, i.e., there will be a depth value for each sampling position (which it may share with other sampling positions stored in the depth buffer), that is used for the late depth test.

The result of the late depth test performed in respect of a fragment/sampling position should be, and is in an embodiment, used, as appropriate, to determine whether the fragment/sampling position is to be culled, and/or whether the fragment/sampling position is to be used to update the depth test data buffer (thus the late depth test can be used for "discard" or "update", or both discard and update, as required). (This may, and in an embodiment does, depend upon whether the fragment/sampling position is being used to (potentially) update depth values only, and/or to provide another result (output) as well, such as, and in an embodiment, to determine primitive coverage.)

In an embodiment, any sampling positions of a fragment that fail the late depth test are "culled" from further processing by not using the rendered fragment data for the fragment for those sampling positions as rendered output data for the render output being generated (thus the rendered fragment data for culled sampling positions for a fragment will, e.g., and in an embodiment, not be written to the tile and/or frame buffer, for example).

Correspondingly, the depth buffer should not be, and in an embodiment is not, updated for those culled sampling positions.

Correspondingly, the rendered fragment data for the fragment for any sampling positions of a fragment that pass the late depth test is in an embodiment used as rendered output data for the render output being generated for those sampling positions (thus the rendered fragment data for sampling positions for a fragment that pass the late depth test will, e.g., and in an embodiment, be written to the tile and/or frame buffer, for example).

Correspondingly, when the late depth test is being used to determine whether to update the depth buffer(s) with respect to the fragment being tested, when a sampling position or positions of the fragment being tested passes the late depth test, then the depth buffer(s) should be appropriately updated with new data for the sampling position(s) in question (that passed the late depth test). (All the appropriate depth buffers used by the graphics processor should be, and are in an embodiment, updated appropriately when at least one sampling point associated with a fragment passes the depth test.) Conversely, when a sampling position or positions of the fragment being tested fails the late depth test, then the depth buffer(s) should not be, and is in an embodiment not, updated with depth data for the sampling positions of the fragment that failed the late depth test.

The early depth tester can correspondingly operate in, and carry out the early depth test (when that is to be performed) in, any suitable and desired manner, e.g. in the normal manner used in the graphics processing system in question.

The early depth test in an embodiment operates on (tests) single fragments. It is in an embodiment performed per sample, and so in an embodiment operates on (tests) (covered) sampling positions of the set of sampling positions that a given fragment is associated with individually. Thus, the early depth test in an embodiment operates on single (covered) sampling positions. (The test will test (individually) those sampling positions that a fragment is being used to render (i.e. that are covered by the primitive in question).) In this case each sampling position in an embodiment has an associated depth value (which may be shared with other sampling positions) (i.e., the depth buffer will store a depth value for each sampling position of the render output in question).

The early depth test may also be performed once for a (and per) fragment when using a sampling mode that tests a single sample per fragment.

The early depth test may be implemented, e.g., as part of the rasteriser, or after the rasteriser (but before the renderer). In an embodiment it is implemented as part of the rasterisation process and/or after the rasteriser but before the rest of the graphics processing pipeline.

Again, the early depth test in an embodiment can be used to determine whether the fragment/sampling position is to be culled (discarded), and/or whether the fragment/sampling position is to be used to update the depth test data buffer (thus the early depth test can be used for "discard" or "update", or both discard and update, as required) (and this may be, e.g., indicated by appropriate state or meta information associated with a fragment).

The technology described herein is particularly concerned with the situation where the early depth test is being used to (potentially) update the depth buffer (i.e. will result in the depth buffer being updated when the fragment passes the depth test). In the case where the early depth test is simply being used as a "discard" test (and so will not update the depth buffer irrespective of whether the fragment passes the early depth test or not), then the early depth test could still be carried out in accordance with the technology described herein, but that is not necessary, and it could also be performed in other manners, should that be desired. Correspondingly, where the early depth test is being performed for both "update" and "discard" purposes, then at least the "update" aspect of the early depth test should be treated and handled in the manner of the technology described herein, but the "discard" part of the process could, for example, still be performed as an "immediate" early depth test, even if the "update" operation is determined as needing to be delayed.

In the technology described herein, when a fragment is to undergo an early depth test that is to update the depth buffer (that will, if passed, update the depth buffer), it is first determined whether the fragment can undergo the early depth test to update the depth buffer without waiting for another fragment to complete its depth test, or whether the completion of a late depth test for another fragment (that is already in the graphics processing pipeline) should be completed before performing a depth test to (potentially) update the depth buffer for the fragment that is to undergo the early depth test to update the depth buffer. In other words, for a fragment that is to undergo an early depth test to update the depth buffer, it is, in effect, determined whether the fragment can (should) undergo that early depth test immediately, or whether the fragment should wait until another fragment has completed a late depth test before undergoing a depth test to (potentially) update the depth buffer.

The determination of whether a fragment should undergo its early depth test to update the depth buffer immediately or not can be performed in any suitable and desired manner, and can be dependent upon any suitable and desired criteria (conditions). In an embodiment, this is based on whether the fragment that is to undergo the early depth test to update the depth buffer has any ordering dependency on an earlier fragment that is already in the graphics processing pipeline and that is still to undergo the late depth test, and, in an embodiment, whether that ordering dependency needs to be enforced to ensure the correct rendering result.

In an embodiment, the existence of an ordering dependency on an earlier fragment that is already in the graphics processing pipeline and that is still to undergo the late depth test is determined based on whether there is any earlier fragment that is already in the graphics processing pipeline after the early depth test that is still to undergo a late depth test, and that could overlap, at least in part, with the fragment that is to undergo the early depth test, or not. Such an "overlap" determination is in an embodiment based on whether there is any earlier fragment that is already in the graphics processing pipeline after the early depth test that is still to undergo a late depth test, and that could cover at least one of the sampling positions that the fragment that is to undergo the early depth test covers. In other words, it is determined whether there is any potentially earlier overlapping fragment that is already in the graphics processing pipeline and that still has to undergo a late depth test.

The presence of "overlap" may be determined in any suitable and desired manner, but in an embodiment is done by considering the (e.g. (x, y)) positions of one or some or all of the sampling points and/or fragments currently occupying the graphics processing pipeline, and the (e.g. (x, y)) position(s) of the fragment (and/or of the sampling positions associated with that fragment) that is to undergo the early depth test.

Whether any fragment could overlap with an earlier fragment that is already in the graphics processing pipeline could be determined precisely (and in one embodiment this is what is done), by comparing the exact positions of one or more or some or all of the sampling points and/or fragments currently occupying the graphics processing pipeline and the position of the fragment (and/or sampling positions associated with that fragment) that is to undergo the early depth test.

However, in an embodiment, a less precise "overlap" determination is performed, that simply considers whether there are any fragments currently occupying the graphics processing pipeline within a region of the render output being generated that the fragment that is to undergo the early depth test also falls within. In this case therefore, it will be determined whether the fragment that is to undergo the early depth test to update the depth buffer and any earlier fragments in the graphics processing pipeline occupy the same region of the render output, without necessarily (and in an embodiment without) determining whether the fragment that is to undergo the earlier depth test actually and definitely overlaps with any fragment that is already in the graphics processing pipeline.

Thus, in an embodiment, it is determined whether a fragment that is to undergo an early depth test to update the depth buffer has an ordering dependency on a fragment that is already in the graphics processing pipeline by considering whether there are any earlier fragments that are already in the graphics processing pipeline that fall within (that occupy) the same region of the render output as a region of the render output that the fragment that is to undergo the early depth test to update the depth buffer falls within (occupies).

The regions of the render output that are considered in this case could be any suitable and desired size. For example, each region could correspond to an individual sampling position within the render output (in which case it may be determined precisely whether any fragments overlap or not), but in an embodiment the regions that are considered correspond to respective regions comprising blocks of plural sampling positions within the render output. For example, each region could correspond to the set of sampling positions corresponding to a single fragment (in which case it will, e.g., be identified whether there are overlapping fragments, but without considering whether individual covered sampling points of the fragments actually overlap or not). Alternatively, larger regions, for example comprising respective blocks (sets) of plural fragments could be considered, or, indeed, a single region corresponding to the render output as a whole could be considered (in which case it will simply be determined whether there are any earlier fragments still in the graphics processing pipeline when a new fragment falls to be subjected to an early depth test to update the depth buffer).

Other arrangements would, of course, be possible.

To facilitate the above operation, in an embodiment a record is kept of the positions of those fragments that are currently in the graphics processing pipeline and that have yet to undergo the late depth test. In an embodiment, it is tracked for respective regions within the area of the render output being generated, whether any fragments that have still to undergo the late depth test are present in the graphics processing pipeline for that region. This could be done in any suitable and desired manner.

The tracking of the presence of fragments in the graphics processing pipeline could be done for any desired resolution of regions within (sub-division into regions of) the area of the render output. For example, this could be tracked for each individual sampling position within the render output, or for respective sets of plural sampling positions (such as respective blocks of plural sampling positions) within the render output. In one embodiment, the presence of fragments in the graphics processing pipeline is tracked for respective fragment positions in the render output (thus, e.g., and in an embodiment, for respective 2×2 "quads" of sampling positions within the render output). Other arrangements, such as tracking the presence of fragments in the graphics processing pipeline for larger regions of the render output could also or instead be done, if desired. Indeed, in another embodiment, the presence of other fragments in the graphics processing pipeline is simply tracked for the render output as a whole.

Thus, the presence of other fragments in the graphics processing pipeline could be tracked for plural regions of the render output, or for a single region corresponding to the render output as a whole.

In these arrangements, when it is determined that there are no earlier fragments in the graphics processing pipeline for the region of the fragment that is to undergo the early depth test to update the depth buffer (i.e. such that the "new" fragment has no ordering dependency on any earlier fragment that is already in the pipeline), then it is (in an embodiment) determined that the fragment that is to undergo the early depth test to update the depth buffer can undergo the early depth test that will update the depth buffer without waiting for any other fragment to complete a late depth test (i.e. it is determined that the fragment that is to undergo the early depth test can undergo that early depth test immediately). Accordingly, in this case, the fragment that is to undergo the early depth test is (in an embodiment) then subjected to the early depth test without waiting for any other fragment to complete a late depth test (i.e., and in an embodiment, immediately).

On the other hand, when it is determined that there is an earlier fragment already in the graphics processing pipeline and that is still to undergo the late depth test for the region in the render output occupied by the fragment that is to undergo the early depth test to update the depth buffer (i.e. such that the "new" fragment has an ordering dependency on an earlier fragment that is already in the pipeline), then in one embodiment it is simply decided that the fragment that is to undergo the early depth test to update the depth buffer should wait for the fragment(s) occupying the same region in the render output to complete its late depth test before the fragment that is to undergo the early depth test to update the depth buffer is subjected to a depth test to update the depth buffer.

However, in an embodiment when it is determined that there is an earlier fragment already in the graphics processing pipeline and that is still to undergo the late depth test for the region in the render output occupied by the fragment that is to undergo the early depth test to update the depth buffer (i.e. it is determined that an ordering dependency exists), one or more additional criteria (conditions) are also considered to determine whether to subject the fragment that is to undergo the early depth test to update the depth buffer to that early depth test immediately, or whether to wait for a fragment that is already in the graphics processing pipeline to complete its late depth test before performing a depth test to update the depth buffer for the fragment that is to undergo the early depth test to update the depth buffer.

In an embodiment, a condition that is considered for determining whether a fragment that is to undergo an early depth test to update the depth buffer should undergo that early depth test without waiting for another fragment to complete a late depth test in the case where there is an earlier fragment already in the graphics processing pipeline for the same region in the render output as the fragment that is to undergo the early depth test, comprises whether the earlier fragment that is already in the graphics processing pipeline and that is still to undergo a late depth test will, if it passes that late depth test, only update the depth buffer or not.

In this case, when the earlier fragment that is already in the graphics processing pipeline is (potentially) to produce as a result of its late depth test a result that is other than simply updating the depth buffer, then it is in an embodiment determined that the fragment that is to undergo the early depth test to update the depth buffer should await the earlier fragment that is already in the graphics processing pipeline completing its late depth test before undergoing a depth test to update the depth buffer.

This would be the case where, for example, and in particular, the earlier fragment that is already in the graphics processing pipeline will, if it passes the late depth test, write out its data values for the render output in question (in other words, where the late depth test is being used to determine sampling position coverage for the fragment and to write out the fragment's data for the render output accordingly). It would also be the case where the earlier fragment could, either as a result of the late depth test or as a result of an operation after the late depth test (should the fragment pass the late depth test) will produce one or more "side effects".

The Applicants have recognised in this regard that where the result of a late depth test for a fragment is to be used for more than simply updating the depth buffer, then any depth test that will (potentially) update the depth buffer for a later fragment having the same position as that fragment should in an embodiment be performed in the correct fragment order, so as to avoid the risk of an erroneous late depth test output result. Thus, in an embodiment, it is determined that the fragment that is to undergo the early depth test to update the depth buffer should await the earlier fragment that is already in the graphics processing pipeline completing its late depth test before undergoing a depth test to update the depth buffer.

On the other hand, when any (and all of the) earlier fragments that are already in the graphics pipeline for the region in question only operate to update the depth buffer if they pass the late depth test, then the depth comparison functions to be used for the depth test for any fragment in the graphics processing pipeline for the region in question that is still to undergo the late depth test and the depth comparison function to be used for the early depth test to update the depth buffer for the fragment that is to undergo the early depth test to update the depth buffer are in an embodiment considered to determine whether the later fragment that is to undergo the early depth test to update the depth buffer can undergo its early depth test to update the depth buffer without waiting for any other fragment to complete a late depth test.

In other words, the determination of whether a later fragment that is to undergo the early depth test to update the depth buffer can undergo its early depth test without waiting for any other earlier fragment to complete a late depth test is additionally based on the depth comparison functions to be used for the depth test for any earlier fragments for the region in question in the graphics processing pipeline that are still to undergo the late depth test and for the fragment that is to undergo the early depth test to update the depth buffer.

The Applicants have recognised in this regard that a later fragment that is to undergo an early depth test to update the depth buffer can undergo that early depth test and (potentially) update the depth buffer "out of order" with earlier overlapping fragments that are already in the graphics processing pipeline (and then only operate to update the depth buffer), so long as the depth comparison functions to be used for the earlier fragments that are already in the pipeline and for the later fragment that is to undergo the early depth test to update the depth buffer are appropriately "compatible" with each other.

In particular, the Applicants have recognised that if the depth comparison functions to be used for the depth test for any earlier (potentially) overlapping fragments that are in the graphics processing pipeline that are still to undergo the late depth test and the depth comparison function to be used for the early depth test for the fragment that is to undergo the early depth test to update the depth buffer are commutative (i.e. the end result (i.e. the final value(s) in the depth buffer) once all the depth tests have been performed would be the same, irrespective of the order in which the individual depth tests are actually carried out), then it would be possible to perform the depth test for the later fragment before any earlier fragment that is already in the graphics processing pipeline undergoes its late depth test, without causing any errors as a result of the depth tests being performed "out of order". Thus in this case, the depth tests for the fragments to update the depth buffer can be performed "out of order".

Correspondingly, if any still to be done (outstanding) updates to the values in the depth buffer that would be caused by the depth comparison functions to be used for the depth tests for any earlier fragments that are already in the graphics processing pipeline and for the early depth test for the fragment that is to undergo the early depth test to update the depth buffer will be monotonic (i.e. such that the depth values in the depth buffer will either never decrease or never increase as a result of the depth comparison tests for the earlier fragments that are already in the graphics processing pipeline and for the early depth test for the fragment that is to undergo the early depth test to update the depth buffer), then again the Applicants have recognised that in that case, the various depth tests can be performed "out of order" without affecting the final result in the depth buffer once all the depth tests have been completed. (In other words, in this case again, the early depth test that will update the depth buffer can be performed "out of order" for the later fragment, if that fragment falls to be subjected to its early depth test before an earlier fragment that is already in the graphics processing pipeline undergoes its late depth test, without causing any errors as a result of the depth tests being performed "out of order").

Thus, in an embodiment, when any earlier (potentially) overlapping fragments that are already in the graphics processing pipeline only operate to update the depth buffer if they pass the late depth test, it is considered whether the depth comparison functions to be used for the depth tests for any fragments in the graphics processing pipeline for the region in question that are still to undergo the late depth test and the depth comparison function to be used for the early depth test for the fragment that is to undergo the early depth test to update the depth buffer are commutative with each other or not, and/or whether the changes that could be caused to the depth buffer by the depth tests for those fragments are monotonic or not.

In the case where the depth comparisons to be performed for the earlier fragment or fragments that are already in the graphics processing pipeline and that are still to undergo the late depth test and the "new" fragment that is to undergo the early depth test to update the depth buffer are commutative/monotonic with each other, it is (in an embodiment) then determined that the later fragment that is to undergo the early depth test to update the depth buffer can undergo its early depth test without waiting for any other fragment to complete a late depth test (i.e. it is determined that the fragment that is to undergo the early depth test to update the depth buffer can undergo that early depth test out of order). Accordingly, in this case, the fragment that is to undergo the early depth test is (in an embodiment) then subjected to the early depth test without waiting for any other fragment to complete a late depth test (i.e., in an embodiment immediately).

On the other hand, when the depth comparisons for the fragment that is to undergo the early depth test that will update the depth buffer and for any earlier fragments that are already in the graphics pipeline that overlap with that fragment are not commutative/monotonic, then it is in an embodiment determined that the fragment that is to undergo the early depth test to update the depth buffer should await the earlier fragment(s) that is already in the graphics processing pipeline completing its depth test before undergoing a depth test to update the depth buffer.

The determination of whether the depth comparisons to be performed for respective fragments are commutative/monotonic with each other or not can be performed in any suitable and desired manner. For example, where the depth comparison is set globally for the render output being generated (such that all fragments will undergo the same depth comparison operation), then it can be assumed that all the depth comparisons for all the fragments will be commutative/monotonic.

On the other hand, where different fragments for the same render output can be allocated different depth comparison functions, then the different depth comparison functions of the fragments should be, and are in an embodiment, considered, to determine whether they are commutative/monotonic or not. (In this case, individual fragments, or sets of sequences of fragments, for example, may be able to be allocated different depth comparison functions, which different depth comparison functions may, e.g., be indicated in appropriate metadata (state information) that is associated with the fragments. Other arrangements would, of course, be possible.)

In an embodiment, depth comparison functions are considered to be commutative/monotonic when they are all from the set: equal to; less than or equal to; and less than.

Correspondingly, in an embodiment, depth comparison functions are considered to be commutative/monotonic when they are all from the set: equal to; greater than or equal to; and greater than.

On the other hand, a less than, or less than or equal to, depth comparison is not considered to be commutative/monotonic with a greater than, or greater than or equal to, depth comparison (and vice-versa).

In order to determine whether the depth comparisons for plural fragments for the same position in the render output are suitably compatible (e.g. commutative/monotonic) with each other or not, it would, for example, be possible to compare directly the depth comparison functions that are allocated to the fragments in question (e.g. by comparing the appropriate metadata/state information that indicates the depth comparison functions for the fragments in question) (and in one embodiment, this is what is done).

It will be appreciated from the above that, in the embodiments of the technology described herein at least, a determination is made as to whether a fragment can be subjected to an early depth test to (potentially) update the depth buffer "out of order", in dependence upon one or more of, and in an embodiment all of: whether the fragment could have any ordering dependency on another fragment that is already in the graphics processing pipeline; whether any fragment that is already in the graphics processing pipeline for which there is an ordering dependency will only update the depth buffer as a result of its late depth test or not; and whether the depth comparison functions for the fragment to be early depth tested and for any fragments already in the graphics processing pipeline that the fragment to be early depth tested potentially has an ordering dependency on are compatible or not.

In addition to the above criteria, the Applicants have recognised that where it can be known with sufficient certainty and determined by other means that a fragment that is still to undergo a late depth test will pass that late depth test without the need for the fragment to undergo the late depth test (this information may be determined, for example, earlier in the pipeline, for example by the rasteriser, and could then be associated with the fragment to indicate that the fragment will pass the late depth test, without the fragment needing to undergo the late depth test), then in that this case as well, the early depth test to (potentially) update the depth buffer could be performed "out of order" with such a fragment, since even though an earlier fragment in the pipeline has still to undergo its late depth test, the result of that late depth test is already known from another source (and so any "out of order" update will not affect the late depth testing "result").

The various conditions for (potentially) performing an early depth test that will update the depth buffer for a fragment out of order can be assessed, and, e.g., tracked, in any suitable and desired manner. For example, separate data structures could be maintained and checked for determining whether any ordering dependency exists, and, for, if so, then considering the output of the depth test(s) and/or the depth comparison functions to be used for the fragments in those circumstances.

In an embodiment, to facilitate the operation in the manner of the technology described herein, a record or records is maintained for respective regions within a render output being generated that can be used to determine whether fragments in the respective regions can be early depth-tested to (potentially) update the depth buffer without waiting for any fragments to complete a late depth test (i.e. can be early depth tested to update the depth buffer out of order) or not.

A record or records could be maintained (kept) for any desired resolution of regions (sub-division into regions) within the area of the render output. For example, record(s) could be maintained for each individual sampling position within the render output, or for respective sets of plural sampling positions (such as respective blocks of plural sampling positions) within the render output. In one embodiment, a record is maintained for respective fragment positions in the render output (thus, e.g., and in an embodiment, for respective 2×2 "quads" of sampling positions within the render output). Other arrangements, such as maintaining a record for larger regions within the render output could also or instead be used, if desired. In one embodiment a (single) record is maintained for the render output as a whole (the record is kept simply for the render output as a whole).

In an embodiment, it is tracked for respective regions in the render output, whether fragments that are present in the graphics processing pipeline for a (and each) region of the render output have suitably compatible (e.g. commutative/monotonic) depth comparison functions or not.

This is in an embodiment done by tracking for each respective region within the area of the render output, whether a fragment that is to undergo the late depth test and having a "greater than" or "greater than or equal to" depth test comparison function is present in the pipeline for that region, and, correspondingly, also, and separately, tracking whether a fragment that has a "less than" or "less than or equal to" depth comparison function is present in the pipeline for that region.

In an embodiment, this is done by tracking for each respective region within the area of the render output, whether a primitive that is to undergo the late depth test and having a "greater than" or "greater than or equal to" depth test comparison function has entered the pipeline for that region, and, correspondingly, also, and separately, tracking whether a primitive that has a "less than" or "less than or equal to" depth comparison function has entered the pipeline for that region.

In this case, the "seen" "greater than, or greater than or equal to" record for a region would be set when a primitive that has a "greater than" or "greater than or equal to" depth test comparison function for its late depth test enters the pipeline (and correspondingly for the "seen" "less than or less than or equal to" record).

In this case, if both the "seen" "greater than or greater than or equal to" and "seen" "less than or less than or equal to" records have been set for a region (i.e. indicating that fragments to undergo the late depth test and having those depth comparison functions have entered the pipeline for the same region), then it can be determined that fragments having incompatible late depth tests have entered the pipeline for the region (and so it can be determined that fragments should not undergo early depth tests that will potentially update the depth buffer for the region in question).

In this case, the tracking of whether fragments/primitives having a greater than or greater than or equal to, or less than or less than or equal to, late depth test comparison functions are in the pipeline could simply track whether any such fragments/primitives have entered the pipeline for a region (and so be set once such a fragment/primitive enters the pipeline, and left set thereafter until the render output in question is completed).

Alternatively, a more sophisticated arrangement, for example, that counts how many fragments/primitives having the later depth test comparison function in question have entered the pipeline, and then decrements that count when an appropriate fragment/primitive undergoes its late depth test, so as to more accurately track whether fragments/primitives having incompatible depth tests are currently present in the pipeline for a region or not, could be used, if desired.

It would be possible in this regard simply to maintain, and then check appropriately, separate "seen" "greater than or greater than or equal to" and "seen" "less than or less than or equal to" records for respective regions within the render output.

However, in an embodiment, an overall record that indicates whether fragments in respective regions of the render output can be early depth tested to (potentially) update the depth buffer without waiting for any fragments to complete a late depth test or not, is maintained.

In an embodiment, this record is in the form of an array of record entries, such as a bitmap, that is maintained at a desired resolution of regions within the area of the render output, that indicates for each respective region that an entry in the array (e.g. bitmap) represents, whether fragments for the render output region in question can be early depth-tested to update the depth buffer out-of-order or not. (In the case where the record is maintained for the render output as a whole, there may accordingly be a single entry, e.g. bit, used for this purpose.)

This will then, in effect, keep track of those render output regions (or simply for the render output as a whole, where a record is simply maintained for the render output as a whole) where early depth tests to update the depth buffer can be performed out of order.

To maintain a record for respective regions within the render output being generated of whether fragments in the respective regions can be early depth-tested to update the depth buffer without waiting for any fragments to complete a late depth test (i.e. can be early depth tested to update the depth buffer out of order) or not, in an embodiment, the record (e.g. bitmap) entry for a region is initially set to indicate that early depth tests to update the depth buffer for that region can be performed out of order, with that record (bitmap) entry then being "unset" to indicate that the depth tests cannot be performed out of order, once a fragment/primitive that is to undergo a late depth test and that has a depth comparison function that is not compatible with (e.g., and in an embodiment, that is not commutative/monotonic with) the late depth test for any previous fragments for the region in question (e.g., and in an embodiment, and that are still to undergo a late depth test) enters the graphics processing pipeline for the region in question.

Thus a record entry will, for example, and in an embodiment, be unset (to indicate that a fragment that is to undergo the early depth test to update the depth buffer should await any earlier fragment that is already in the pipeline completing its late depth test before undergoing a depth test to update the depth buffer), if (when) the direction of the depth test changes for that render output region (i.e. from being a greater than to a less than test or vice-versa).

In the embodiment, it is determined whether primitives/fragments having incompatible depth comparison functions have entered the pipeline for a region of the render output by, as discussed above, maintaining "seen" "greater than or greater than or equal to" and "seen" "less than or equal to" records for regions within that render output, as discussed above, with it then being determined that fragments having incompatible depth functions are present for a region of the render output, when both the "seen" "greater than or greater than or equal to" and "seen" "less than or less than or equal to" records for the region have been set. Thus, the overall record entry for a region would be "unset" to indicate that any early depth test to update the depth buffer cannot be performed for that region once both the "seen" "greater than or greater than or equal to" and "seen" "less than or less than or equal to" records for the region are set (i.e. once the second of those records is set for the region (once one of them has been set)).

Thus, in an embodiment, as well as maintaining an overall record indicative of whether corresponding depth tests to update the depth buffer can be performed out of order for the output regions, separate "seen" "greater than or greater than or equal to" and "seen" "less than or less than or equal to" records are also maintained for the respective regions within the render output (and used to update the overall record indicative of whether early depth tests to update the depth buffer can be performed out of order or not for the regions, accordingly).

In an embodiment, an entry in the overall record indicative of whether early depth tests to update the depth buffer can be performed out of order for regions of the render output or not is also unset to indicate that early depth tests to update the depth buffer cannot be performed out of order (must be performed in the correct rendering order for the region in question), once a fragment/primitive enters the graphics processing pipeline for the region in question for which the result of the late depth test is to be used for more than solely updating the depth buffer. This will then allow the overall record (bitmap) to also keep track of those render output regions where a fragment/primitive that is to do more than solely update the depth buffer has entered the graphics processing pipeline and is to undergo the late depth test.

Thus, in an embodiment, a record (e.g. bitmap) entry is initially set to indicate that early depth tests to update the depth buffer can be performed out of order for that region, with that record (e.g. bitmap) entry then being unset to indicate that early depth tests to update the depth buffer should not be performed out of order once a fragment/primitive for the region in question that is to undergo a late depth test and that has a depth comparison function that is not compatible with the late depth test for a previous fragment for the region that is to undergo the late depth test, or for which the result of the late depth test is to be used for more than solely updating the depth buffer, enters the graphics processing pipeline.

Thus, in an embodiment, where the late depth test for a fragment is also being used to control (determine) whether the fragment writes an output (e.g. writes colour values) (i.e. such that this fragment will write an output if it passed and when it passes the late depth test), then a record (bitmap) entry for the region that the fragment relates to will be unset to indicate that at early depth tests to update the depth buffer should not be performed out of order.

In an embodiment, as well as a record (bitmap) entry being unset to indicate that early depth tests should not be performed out of order for a render output region once a fragment/primitive for which the result of the late depth test is to be used for more than solely updating the depth buffer enters the graphics processing pipeline, a record (bitmap) entry is unset to indicate that early depth tests should not be performed out of order for a render output region once a primitive/fragment that has one of (and in an embodiment any of): side effects; stencil enabled; or is being used for an occlusion query; enters the graphics processing pipeline for a render output region.

Thus, in an embodiment, a record (bitmap entry) for a render output region is also unset to indicate that early depth tests cannot be performed out-of-order, once a primitive or fragment enters the graphics pipeline for the region in question and for which any one of the following conditions applies: the result of the late depth test is to be used for outputting (writing) output (e.g. colour) values; the primitive/fragment has side effects; the primitive/fragment has stencil test enabled; or the primitive/fragment is being used for an occlusion query.

It will be appreciated from the above that where a record is maintained for respective regions within the render output, in which the record entries are set and unset in the above manner to indicate whether early depth tests to update the depth buffer can be performed out of order for the respective regions in the render output, then that will not only keep track of those regions where the depth test results and depth comparison functions between earlier fragments and a later fragment that is to undergo an early depth test to update the depth buffer are compatible or not, but will also (automatically) keep track of, and indicate, those render output regions (positions) where a fragment ordering dependency exists (and whether that fragment ordering dependency can be ignored, or must be enforced). Thus, maintaining a record that tracks the suitability of fragments that are in the graphics processing pipeline for performing an early depth test to update the depth buffer out of order or not in the above manners, directly and automatically tracks and takes account of the various criteria discussed above for determining whether a fragment can be subjected to its early depth test to update the depth buffer out of order or not in the manner of the technology described herein.

These arrangements accordingly straightforwardly allow those fragments for which an early depth test to update the depth buffer can be performed "out of order" in accordance with the technology described herein to be identified.

In these arrangements, before a fragment that is to undergo the early depth test to update the depth buffer reaches the early depth test, the corresponding record (e.g. bitmap) entry for the render output region that includes the fragment in question can be, and is in an embodiment, checked, to determine whether the early depth test to update the depth buffer for that fragment can be performed without waiting for any other fragment to complete a late depth test (i.e. out of order) or not, with the fragment then being subjected to the early depth test to update the depth buffer without waiting for any other fragment to complete a late depth test or not, accordingly.

In these arrangements, the record indicating those render output regions (positions) for which the early depth test to update the depth buffer can be performed "out of order" could be used to continuously track sequences of fragments as a render output is being generated (i.e. such that once an incompatible fragment enters the graphics processing pipeline and the record entry is "unset", it is then determined whether the graphics processing pipeline then contains fragments that are compatible with that new fragment, with the record entry then being "reset" to indicate that early depth test to update the depth buffer can be performed "out of order" in that case, until such time as an "incompatible" fragment enters the graphics processing pipeline again (with the tracking then resetting for the next sequence of fragments, and so on)) (and in one embodiment, this is what is done).

Correspondingly, and in an embodiment, a record entry for indicating that the early depth test to update the depth buffer can be performed "out of order" for a render output region could be "reset" to indicate that the early depth test to update the depth buffer can be performed "out of order" once a fragment for the region in question for which the result of the late depth test is to be used only for updating the depth buffer and for which there are no earlier fragments already in the graphics processing pipeline for that render output region enters the graphics processing pipeline (as in that case, it would be possible to re-start performing the early depth tests to update the depth buffer "out of order" without leading to erroneous rendering results).

In an embodiment, the record(s) that tracks those render output regions for which an early depth test to update the depth buffer can be performed "out of order", etc., is started when the render output in question is first started to be generated, with each record entry being initially set to indicate that the early depth test to update the depth buffer can be performed "out of order" for that render output region, etc. Thus the relevant tracking records for the regions are in an embodiment appropriately reset when a new render output (e.g. a new rendering tile) is started.

Each record entry is in an embodiment then "unset" to indicate that the depth tests can't be performed "out of order" once a fragment that has an incompatible depth comparison function or that produces an output other than solely updating the depth buffer from the late depth test (if it passes) (etc.) enters the graphics processing pipeline for the region in question, and, in an embodiment, once the record entry for a render output region is unset, then the record entry is left unset for the remainder of the generation of the render output in question, such that thereafter any fragments for the render output region in question that are to undergo an early depth test to update the depth buffer will then await any earlier fragment that is already in the graphics processing pipeline to complete its depth test before undergoing a depth test to update the depth buffer.

In this case therefore, following the start of the generation of the render output, for each render output region for which a record is maintained, any early depth tests to update the depth buffer will be able to be done (and will be done) out of order, until the first fragment having an incompatible depth comparison function or that does more than solely update the depth buffer as a result of its late depth test enters the pipeline for the render output region, with any further fragments for that render output region that are to undergo the early depth test to update the depth buffer thereafter then awaiting any earlier fragment that is already in the graphics processing pipeline to complete its late depth test before undergoing a depth test to update the depth buffer.

Thus, for example, in the case where a record of whether early depth tests to update the depth buffer can be performed "out of order" is maintained for the render output as a whole, then when the generation of the render output in question is started, the graphics processor will operate to perform any early depth tests to update the depth buffer for fragments for the render output "out of order", until the first fragment that is to undergo a late depth test and having an incompatible depth comparison function or that does more than solely update the depth buffer as a result of its late depth test, etc., enters the pipeline. In other words, the graphics processor will, when it starts to generate the render output, in effect, operate in an early depth test "out of order" mode, but then revert to an "in order" depth testing mode once an incompatible fragment enters the graphics processing pipeline.

The above records should be, and are in an embodiment, checked, and if necessary updated (e.g. set or unset), for each primitive/fragment that is to undergo a late depth test that enters the pipeline. The records can be checked and updated at any suitable and desired point in the pipeline. In an embodiment the records are checked, etc., before the early depth test in the pipeline. In an embodiment, the records are checked and (if necessary) updated after the rasteriser but before the early depth test.

Correspondingly, the determination of whether a fragment that is to undergo the early depth test to (potentially) update the depth buffer can undergo that early depth test immediately or not, is in an embodiment done at the same point in the pipeline where the records for determining whether fragments can undergo early depth tests to update the depth buffer are tracked and maintained (thus, before the early depth test, and in an embodiment after the rasteriser).

Thus, in an embodiment, the graphics processing pipeline includes before the early depth test, and in an embodiment between the rasteriser and the early depth test, appropriate control logic (circuit) (a controller) that is operable to maintain the desired records and to perform the determination of whether a fragment that is to undergo the early depth test to (potentially) update the depth buffer should undergo that early depth test immediately, or should wait for another fragment to complete a late depth test before undergoing a depth test to (potentially) update the depth buffer.

It will be appreciated that depending upon where the control logic is arranged in the graphics processing pipeline, primitives may or may not have been rasterised fragments prior to reaching the control logic. Thus the appropriate records and early depth test determinations may, for example, be performed on the basis of the properties of primitives entering the pipeline (and reaching the appropriate control logic stage), or on the basis of the properties of fragments entering the pipeline (and again reaching the control logic stage). Thus the appropriate records, etc., may be set based on the properties of primitives reaching the control logic, or the properties of fragments reaching the control logic or both, if appropriate, and as desired, and as appropriate for the graphics processing pipeline in question.

Other arrangements would, of course, be possible.

When it is determined that the fragment that is to undergo the early depth test that will (potentially) update the depth buffer can (and should) undergo that early depth test without waiting for any other fragment to complete a late depth test, then that early depth test can be carried out in any suitable and desired manner, such as, and in an embodiment, in accordance with the normal manner for performing such depth tests in the graphics processing system in question.

If the fragment fails the early depth test, then it will not update the depth buffer and, if the early depth test was also a "discard" test, then the fragment should be and is in an embodiment, culled (discarded) at that stage (i.e. its further processing in the pipeline is suppressed). (In the case of the early depth test, such culling of a fragment from further processing in the pipeline in an embodiment comprises not subjecting the fragment to the rendering operations (shader pipeline), in an embodiment by not sending the fragment onwards through the pipeline for processing.)

If (when) at least one of the sampling positions associated with the fragment passes the early depth test (and the fragment is to update the depth buffer as a result of its early depth test), then the depth buffer should be, and is in an embodiment, updated with the appropriate depth values for the fragment in question for the sampling positions or positions of the fragment that passed the early depth test. (As discussed above, all the appropriate depth buffers used by the graphics processor should be, and are in an embodiment, updated appropriately when at least one sampling point associated with a fragment passes the early depth test.)

If the purpose of performing the early depth test for the fragment is solely to determine whether to update the depth buffer with the depth values for the fragment, then once the depth buffer has been appropriately updated, the fragment can be, and is in an embodiment discarded (culled), as there would be no need to process it further.

On the other hand, if the fragment is to be processed for other purposes (i.e. the fragment is intended to have processing effects other than simply updating the depth buffer), e.g. to provide rendered output data for the sampling positions that the fragment corresponds to or will execute a shader with side effects, etc., then if (any sampling position of) the fragment passes the early depth test, then as well as, in an embodiment, updating the depth buffer with the depth value(s) for the fragment, the fragment should also be passed onwards in the pipeline for further processing (at least for its covered sampling positions).

In this case, if (when) the early depth test finds that fewer than all of the (covered) sampling positions associated with a fragment pass the early depth test, then in an embodiment further processing of the sampling positions that failed the depth test that can be avoided on an individual sampling position basis, such as blending, is prevented (stopped), e.g., by marking the sampling positions as "disabled" (e.g. by indicating them to not be covered in a coverage mask associated with the fragment in question), or in any other suitable manner, but the fragment in question is still sent onwards (through the pipeline) so that the "non-culled" sampling positions associated with the fragment will still be processed.

In the case where it is determined that the graphics fragment that is to undergo the early depth test to update the depth buffer should await the result of another fragment undergoing a late depth test before undergoing a depth test to update the depth buffer, then the fragment that is to under the early depth test to update the depth buffer will not undergo the early depth test to (potentially) update the depth buffer at that time, and a depth test to update the depth buffer for that fragment will only be performed once the fragment that is still to undergo a late depth test has completed its late depth test. This operation ensures that, where necessary, the later fragment that is to undergo the early depth test that will update the depth buffer undergoes a depth test to update the depth buffer in the correct fragment order relative to any earlier fragments that are already in the graphics processing pipeline and that have still to undergo a late depth test.

A fragment that is to undergo an early depth test to update the depth buffer can be caused to only undergo a depth test to update the depth buffer once a fragment that is still to undergo a late depth test has completed its late depth test in any suitable and desired manner.

In one embodiment, this is achieved by stalling the fragment that is to undergo the early depth test to update the depth buffer at the early depth test stage until the earlier fragment that is still to undergo a late depth test has completed its late depth test, and then subjecting the fragment that is to undergo the early depth test to an early depth test to update the depth buffer thereafter. Thus, in this case, the fragment that is to undergo the early depth test to update the depth buffer will be stalled at the early depth test until any earlier fragments that are already in the graphics processing pipeline have completed their depth tests, so as to ensure that the fragments are subjected to their depth tests that will update the depth buffer in the correct order.

In another embodiment, when it is determined that a fragment that is to undergo the early depth test to update the depth buffer should only be subjected to a depth test to update the depth buffer once a fragment that is still to undergo a late depth test has completed its late depth test, the fragment that is to undergo the early depth test to update the depth buffer is sent onwards into the pipeline past the early depth test without being subjected to an early depth test to update the depth buffer and is subject to further processing in the pipeline, but is then stalled at a (the) point in the pipeline where the depth test result for the fragment in question is needed, until the early fragment that is still to undergo a late depth test has completed its late depth test, with the fragment that is to undergo the early depth test to update the depth buffer then being subjected to a depth test to update the depth buffer at that point. Thus, in this case, the fragment that is to undergo the early depth test to update the depth buffer will be sent onwards down the pipeline until it reaches a point where its depth test result is needed, and then will be stalled at that point in the pipeline until any earlier fragments that are already in the graphics processing pipeline have completed their depth test, so as to ensure that the fragments are subjected to their depth tests that will update the depth buffer in the correct order.

In another embodiment, when it is determined that a fragment that is to undergo the early depth test to update the depth buffer should only be subjected to a depth test to update the depth buffer once a fragment that is still to undergo a late depth test has completed its late depth test, the fragment that is to undergo the early depth test to update the depth buffer is sent onwards into the pipeline past the early depth test without being subjected to an early depth test to update the depth buffer, and is instead configured to be subjected to a late depth test to update the depth buffer and subjected to that late depth test once it reaches the late depth test stage. In other words, the fragment that is to undergo the early depth test to update the depth buffer is in this case converted to a "late depth test" fragment such that it will go through the pipeline and instead update the depth buffer at the late depth test.

These arrangements will also ensure that the fragment that is to undergo the early depth test does not undergo a depth test that will update the depth buffer out of order with the other fragments that are already in the rendering pipeline, as by forcing the fragment that is to undergo the early depth test to update the depth buffer to skip that early depth test and undergo a later depth test that will update the depth buffer instead, all the relevant fragments should then undergo later depth tests that will update the depth buffer in the appropriate and correct fragment order.

Thus, in one embodiment, only performing a depth test that will update the depth buffer for a fragment that is to undergo the early depth test to update the depth buffer once another fragment that is still undergo a late depth test has completed its late depth test comprises subjecting the fragment to an early depth test after the fragment that is still to undergo a late depth test has completed its late depth test, and in another embodiment comprises not subjecting the fragment that is to undergo the early depth test to an early depth test to update the depth buffer, but instead subjecting the fragment that is to undergo an early depth test to update the depth buffer to a depth test to update the depth buffer later in the pipeline (which later depth test will be performed after the fragment that is still to undergo a late depth test has completed its late depth test).

Other arrangements for enforcing the correct depth testing order could be used if desired (where it is determined that the fragments should be depth tested in the correct order).

It should be noted here that the technology described herein is, as discussed above, concerned in particular with the performing of early depth tests that will (if passed) update the depth buffer.

It can, as discussed above, be the case that the early depth test is only being carried out for the purposes of determining whether to discard (cull) a fragment or not. In this case, a corresponding determination could be made as to whether to perform the early depth test for discard purposes on a fragment, if desired, but it would be possible also or instead, to use different criteria for determining whether to perform an early depth test for discard purposes (only) to the arrangement of the technology described herein that is used for determining whether to perform an early depth test for depth buffer update purposes. For example, the Applicants have recognised that an early depth test for discard can still be done when there are outstanding late depth test fragments even when those earlier fragments that are still to undergo the late depth test write colour values, so long as the depth test comparison functions are suitably compatible (i.e. monotonic). Thus, it can be the case that an early depth test for discard could still be performed even when it would not be desirable to perform an early depth test for the purposes of updating the depth buffer.

Correspondingly, in the case where a fragment is to undergo an early depth test for both discard and depth buffer update purposes, even where it is determined in accordance with the technology described herein that the performance of the early depth test on the fragment for updating the depth buffer should be delayed (as discussed above), it could still be possible for the fragment to undergo the early depth test for discard purposes immediately (and in one embodiment this is what is done). In this case, if the early depth test leads to the fragment being discarded, then there is no need to subject it to a later depth test for the purposes of determining whether to update the depth buffer or not. On the other hand, if the fragment passes the early depth test for discard purposes, then it should, as discussed above, be subjected to another, later depth test for the purposes of determining whether to update the depth buffer or not (e.g. to a delayed early depth test or a depth test later on in the pipeline).

Thus, in the case where a fragment is to undergo an early depth test for discard purposes, that early depth test for discard purposes can be performed in any suitable and desired manner (and, e.g., in accordance with the existing protocols for performing early depth tests for discard purposes in the graphics processing system in question), without the need to treat the early depth test for discard purposes in the manner of the technology described herein. However, for any fragment that is to undergo an early depth test that will (potentially) update the depth buffer, then that early depth test is in an embodiment considered and treated in the manner of the technology described herein.

Although the technology described herein has been described above with particular reference to the processing of a single fragment that is to undergo an early depth test, as will be appreciated by those skilled in the art, the technology described herein can be, and is in an embodiment, repeated for plural fragments, such as, and in an embodiment, for each fragment of a sequence of plural fragments that are to undergo an early depth test that have been generated by the rasteriser. The sequence of fragments may, e.g., relate to a given primitive, but in an embodiment relate to a sequence of plural primitives that are being processed to generate a render output.

Thus, in an embodiment, the operation in the manner of the technology described herein is performed for all fragments that are to undergo an early depth test (that will (potentially) update the depth buffer) that have been generated for a render output (for the render output that is being generated). Correspondingly, the technology described herein is in an embodiment repeated for, and used for, each render output of a sequence of render outputs.

The render output that is being produced by the graphics processor could, for example, comprise a tile of an overall output, such as a frame to be displayed, that is being generated by the graphics processor (in a tile-based graphics processing system) (and in one embodiment this is the case). Alternatively, in the case where the graphics processor generates the required output, such as a frame to be displayed, as a whole (rather than a tile-by-tile basis), then the render output will be that overall output, such as the frame to be displayed.

The technology described herein can be used irrespective of the form of output that the graphics processor may be providing. Thus, for example, it may be used where the rendering output is intended to form an image (a frame) for display (e.g. on a screen or printer) (and in one embodiment this is the case). However, the technology described herein may also be used where the rendering output is not intended for display, for example where the rendering output is a texture that the graphics processor is being used to generate (e.g. in "render to texture" operation), or, indeed, where the output the graphics processor is being used to generate is any other form of data array.

For example, the technology described herein can be used where the output of a rendering pass is some form of intermediate data structure that is to be used for or when generating a further rendering output. For example, and in an embodiment, a graphics processing rendering output, such as a frame to be displayed, could be generated by performing two (or more) rendering passes, a first rendering pass that performs depth-only operations and that is intended to populate the depth buffer with values (such that in this pass, rendered primitives will only update the depth buffer), followed by a second, "colour" pass that is to generate the output colour values for the primitives (and which will use the depth buffer generated in the first pass and have an early depth test depth comparison function of "equal to" (such that in the second pass, all primitives except the visible primitives should be discarded by the early depth test)).

In this case, the technology described herein could be implemented in the first, depth-only rendering pass that is intended to only update the depth buffer, but would not be necessary for, and would not be enabled for, the second, "colour" rendering pass (as in that case all fragments will be able to undergo the early depth test using the depth buffer generated from the first, depth-only pass). In this case, the technology described herein can in particular be used to optimise the first, depth-only pass that is to update the depth buffer.

The technology described herein, as discussed above, is in an embodiment performed and used for each fragment of a render output that is to undergo an early depth test to update the depth buffer. It could be the case that all fragments will be subjected to an early depth test to update the depth buffer (and so the technology described herein will be performed for each and every fragment that has been generated for the render output).

Alternatively, the graphics processing system could be configured such that only selected fragments for a render output will be subjected to an early depth test to update the depth buffer (such as, and in an embodiment, those fragments meeting particular, in an embodiment selected, in an embodiment predetermined, criteria to be subjected to the early depth test to update the depth buffer). In this case, the technology described herein will be performed for those fragments that are to undergo an early depth test to update the depth buffer, but not for fragments that are not to undergo an early depth test to update the depth buffer. In this case, fragments generated by the rasteriser could, e.g., and in an embodiment, be associated with appropriate metadata, such as state information, that indicates whether they are to undergo an early depth test to update the depth buffer or not, with the graphics processing pipeline, and in particular the early depth tester, identifying those fragments that are to undergo an early depth test to update the depth buffer from the metadata (state information) accordingly. Thus, in an embodiment, fragments can be denoted as either to undergo an early depth test to update the depth buffer or a late depth test to update the depth buffer.

Other arrangements would, of course, be possible.

It will be appreciated from the above that, in the embodiments of the technology described herein at least, the technology described herein is operable to identify when it is possible to perform early depth tests that will update the depth buffer for fragments out of order, and to then perform those early depth tests out of order. This then allows the overall rendering operation to be performed in a more efficient manner, and, in particular, will increase the opportunities for and the amount of hidden surface removal that can be performed by means of the depth tests.

In some embodiments, the graphics processor comprises, and/or is in communication with, one or more memories and/or memory devices that store the data described herein and/or store software for performing the processes described herein. The graphics processor may also be in communication with a host microprocessor, and/or with a display for displaying images based on the data generated by the graphics processor.

The graphics processor should be, and is in an embodiment, configured to implement and execute an appropriate graphics processing pipeline and should, and in an embodiment does, include appropriate functional units (circuits) for executing the stages of the graphics processing pipeline. The graphics processing pipeline stages may be implemented via fixed function units (hardware) (circuits) of the graphics processor and/or by appropriately programmed programmable functional units (circuits) of the graphics processor, as desired.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems. Thus, in an embodiment, the graphics processor is a tile-based graphics processor.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Subject to any hardware necessary to carry out the specific functions discussed above, the graphics processor and pipeline can otherwise include any one or more or all of the usual functional units, circuits, etc., that graphics processors and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows a typical graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands and data to cause the graphics processor 3 to generate graphics output required by the application 2.

In this system, the graphics processor 3 will execute an appropriate graphics processing pipeline in order to perform the graphics processing required by applications 2 executing on the host processor 1. The graphics processor 3 will include appropriate processing circuits (which may comprise both fixed function and programmable processing circuits) to execute the required functions and stages of the graphics processing pipeline that is to be executed by the graphics processor 3.

Figure 2:
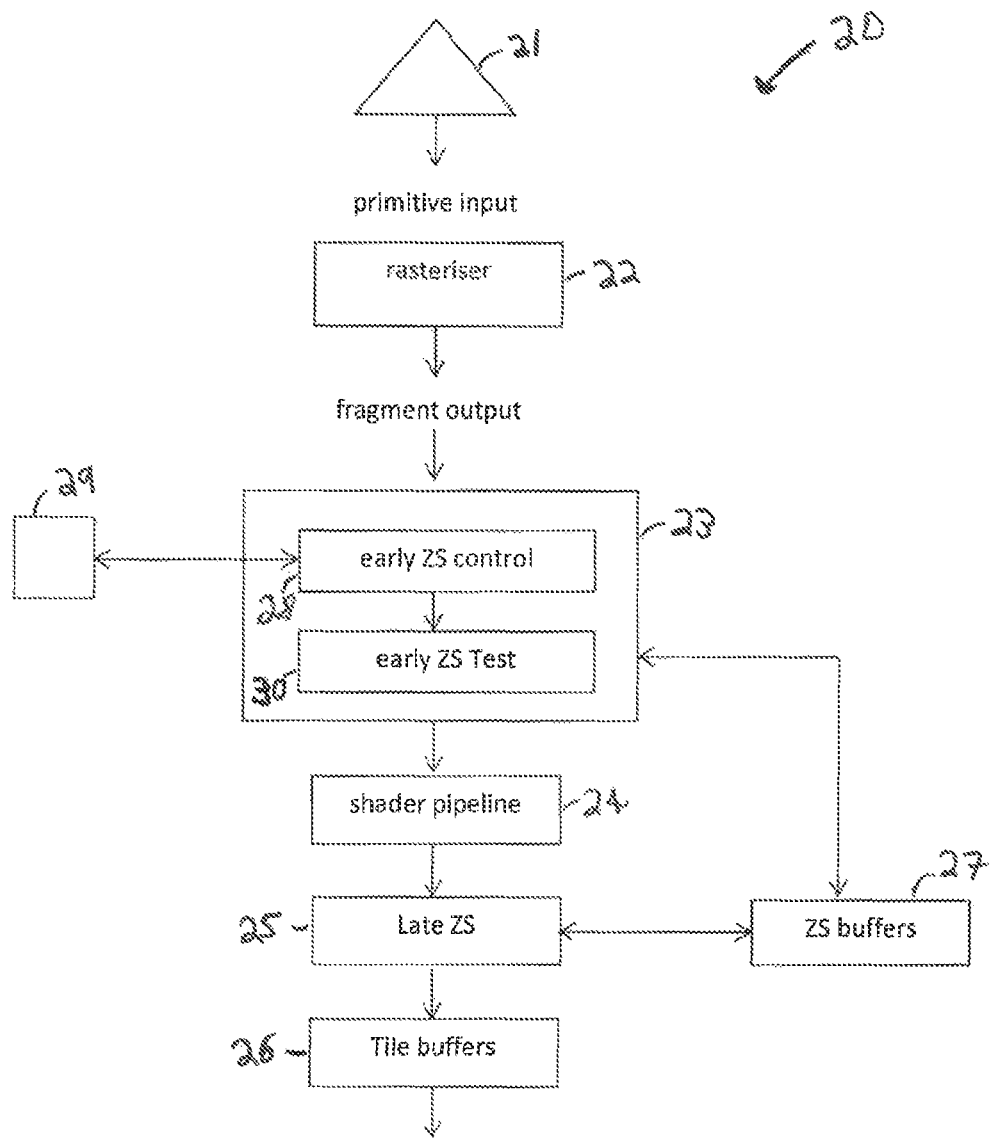
FIG. 2 shows schematically a graphics processing pipeline in an embodiment of the technology described herein.

FIG. 2 shows an embodiment of a graphics processing pipeline 20 that may be executed by the graphics processor 3 in the present embodiments in more detail.

The graphics processing pipeline 20 shown in FIG. 2 is a tile-based renderer and will thus produce tiles of an output data array, such as an output frame to be generated.

In tile-based rendering, rather than the entire graphics processing output, e.g., frame, effectively being processed in one go as in immediate mode rendering, the output, e.g., frame to be displayed, is divided into a plurality of smaller sub-regions, usually referred to as "tiles". Each tile (sub-region) is rendered as a render output separately (typically one-after-another), and the rendered tiles (sub-regions) are then recombined to provide the complete rendering output, e.g., frame for display. In such arrangements, the rendering output is typically divided into regularly-sized and shaped sub-regions (tiles) (which are usually, e.g., squares or rectangles), but this is not essential.

The graphics processing output data array may typically be an output frame intended for display on a display device, such as a screen or printer, but may also, for example, comprise intermediate data intended for use in later rendering passes (such as in the case of a depth-only rendering pass, or a "render to texture" output), etc.

FIG. 2 shows the main elements and pipeline stages of the graphics processing pipeline 20 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuits/circuitry (whether fixed-function or programmable) and/or processing logic, etc., for performing the necessary operation and functions.

FIG. 2 shows schematically the pipeline stages after the graphics primitives (polygons) 21 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 3.

As shown in FIG. 2, this part of the graphics processing pipeline executed by the graphics processor 3 includes a number of processing stages, including a rasterisation circuit (stage) 22, an early ZS (depth and stencil) circuit (stage) 23, a rendering circuit (stage) in the form of a fragment shading pipeline 24, and a late ZS (depth and stencil) test circuit (stage) 25.

The rasterisation circuit 22 operates to rasterise the primitives making up the render output (e.g. the image to be displayed) into individual graphics fragments for processing. To do this, the rasteriser 22 receives graphics primitives 21 for rendering, rasterises the primitives to sampling positions and generates graphics fragments having appropriate positions (representing appropriate sampling positions) for rendering the primitives. In the present embodiment, each graphic fragment that is generated by the rasteriser 22 represents (has associated with it) plural (and normally 4) sampling positions. (Other arrangements would, of course, be possible). Each graphics fragment has associated with it a coverage mask indicating which sampling positions of the plural sampling positions that the fragment represents, it is actually being used to render (i.e. are actually covered by the primitive in question).

Each fragment issued (output) by the rasteriser 22 may then be subjected to an early depth and stencil test by the early depth and stencil test circuit 23. (This may be indicated, e.g., by appropriate state information associated with a fragment.) This early depth and stencil test circuit 23 performs depth and stencil tests on the individual (covered) sampling positions associated with the fragments issued by the rasteriser 22 (i.e. at a per-sampling point resolution). The early depth test can be used as a "discard" test, or as a "discard" and "update buffer" test, as desired.

The early depth and stencil tester 23 uses per-sampling position depth and stencil values stored in depth and stencil buffers 27. The depth and stencil buffers 27 store an appropriate depth (Z) value and a stencil value, respectively, for each sampling position that the buffer represents (essentially for each sampling point position of the tile that is being processed). These values are stored and updated in the depth and stencil buffers 27 when sampling positions being tested by the early depth and stencil tester 23 and the late depth and stencil tester 25 pass the respective depth and stencil tests.

The early depth test 23 compares the depth values of (associated with) the fragments issued from the rasteriser 22 with the (per-sampling position) depth values stored in the depth buffer 27 for the sampling positions in question (in the appropriate manner). When the early depth test is being used to (potentially) update the depth buffer, the depth values for sampling points that pass the early depth test 23 are also written appropriately to the depth-buffer 27 to update it.

The early depth and stencil test 23 is configured to operate in an appropriately conservative manner.

Figure 3:
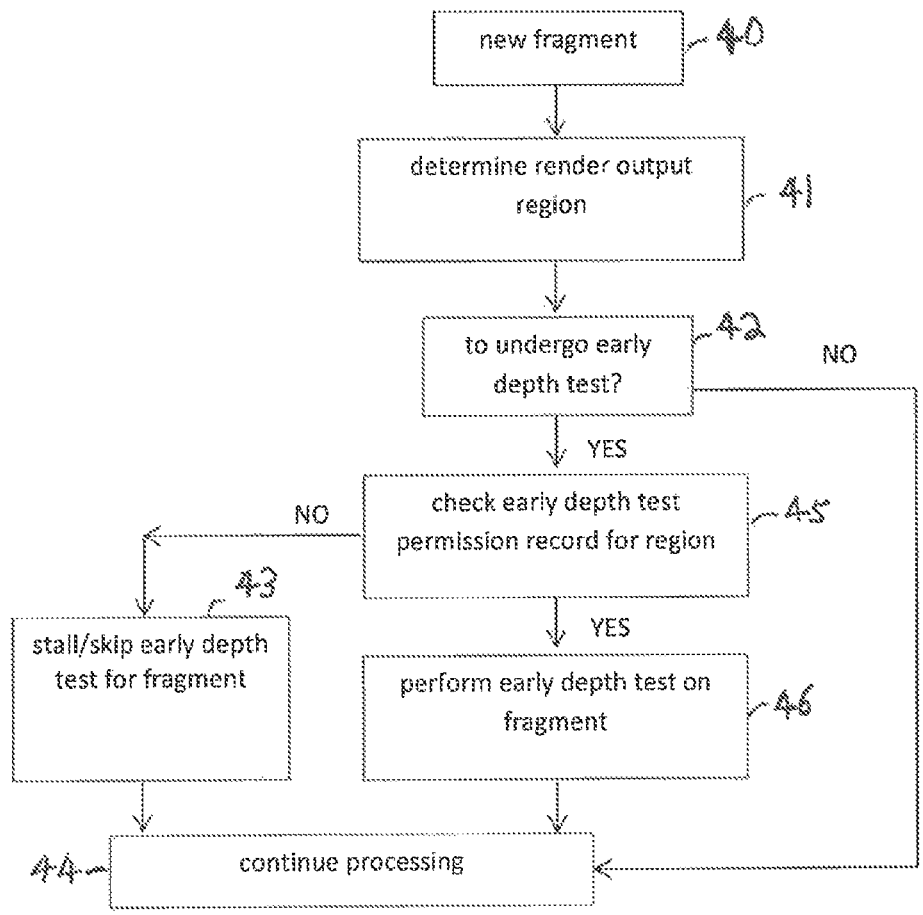
FIG. 3 shows in more detail the operation of the early depth test in an embodiment of the technology described herein.

Fragments that pass the early depth and stencil test 23 (i.e. fragments having at least one associated sampling position that passes the early depth and stencil test 23), or that are not subjected to the early depth and stencil test 23, are then sent onwards to the fragment shader 24 (the renderer), as shown in FIG. 3.

(Fragments that fail the early depth and stencil test 23 are culled by the early depth and stencil test 23.)

The fragment shader 24 performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading circuit 24 is in the form of a shader pipeline (a programmable fragment shader), but other arrangements, such as the use also or instead of fixed function fragment shading units would be possible, if desired.

There is then a "late" fragment depth and stencil test circuit 25, which again can be used as a "discard" test, or as a "discard" and buffer "update" test, as desired is to be performed, e.g. where a fragment did not undergo the early depth and stencil test), the late depth test circuit 25 carries out, inter alia, the end of pipeline depth test on the shaded fragments (on the covered sampling positions associated with shaded fragments), to determine whether the sampling positions that a rendered fragment represents will overdraw the fragments whose values are currently stored in the tile buffer 26 (i.e. determines whether the fragment data for the fragments issuing from the fragment shader 24 should be stored in the tile buffers (should replace or modify the fragment data in the tile buffer(s) of the fragments that have already been rendered)).

To do this, the late depth test 25 compares the depth values of (associated with) the fragments issued from the fragment shader 24 with the (per-sampling position) depth values stored in the depth buffer 27 for the sampling positions in question (in the appropriate manner). When the late depth test is being used to (potentially) update the depth buffer, the depth values for sampling points that pass the late depth test 25 are also written appropriately to the depth-buffer 27 to update it.

This late fragment depth and stencil test circuit 25 also carries out any necessary "late" alpha and/or stencil tests on the fragments.

The fragments that pass (or that don't undergo) the late fragment depth and stencil test 25 are then subjected to any remaining operations necessary on the fragments, such as blending with the framebuffer, dither etc. (not shown).

Finally, the output fragment data values are written to the appropriate tile buffers 26 that store an appropriate, e.g. colour, value for each sampling point that the buffers represent (in essence for each sampling point of the tile that is being processed).

The tile buffers 26 (and the depth and stencil buffers 27) may be provided, e.g., as part of RAM that is located on (local to) the graphics processor 3.

Once a tile has been processed, its data is, e.g., exported from the tile buffers 26 to a main memory (e.g. to a frame buffer in a main memory) (not shown) for storage, and the next tile is then processed, and so on, until sufficient tiles have been processed to generate the entire render output (e.g. frame (image) to be displayed).

The process is then repeated for the next rendering output (e.g. frame) and so on.

Other arrangements for the graphics processing pipeline 20 would, of course, be possible.

As discussed above, the graphics processing pipeline 20 that is executed by the graphics processor 3 in the present embodiments includes an early depth test circuit (stage) 23, which can subject fragments generated by the rasteriser 22 to an early depth test. It may, for example, be indicated in appropriate state information for respective fragments, whether they are to undergo an early depth test at the early depth test circuit 23, or should only undergo a late depth test at the late depth test circuit 25, or should undergo both an early and a late depth test.

In the present embodiments, and in accordance with the technology described herein, for fragments that are indicated as to undergo an early depth test to (if passed) update the depth buffer, rather than those fragments simply automatically undergoing the early depth test to (potentially) update the depth buffer, a check is made as to whether the fragment should undergo the early depth test to update the depth buffer, or should await another fragment completing a depth test before undergoing a depth test to update the depth buffer. This facilitates, as discussed above, performing early depth tests to update the depth buffer on fragments out of order with fragments that are already in the graphics processing pipeline, when it is "safe" to do so.

In the present embodiments, this check is based on whether the fragment that is to undergo the early depth test to update the depth buffer could have any ordering dependency on an earlier fragment that has already entered the graphics processing pipeline, and whether that ordering dependency needs to be enforced to ensure the correct rendering result.

In the present embodiments, it is determined whether a fragment that is to undergo an early depth test to update the depth buffer has an ordering dependency on a fragment that has already entered the graphics processing pipeline by tracking whether any earlier fragments that fell within (that occupy) the same region of the render output as a region of the render output that the fragment that is to undergo the early depth test to update the depth buffer falls within (occupies) have entered the pipeline.

In order to determine whether any ordering dependency needs to be enforced, it is tracked whether fragments that enter the graphics processing pipeline and that are to undergo a late depth test will, if they pass that late depth test, only update the depth buffer or not, and whether the depth comparison functions to be used for the depth tests for fragments that enter the graphics processing pipeline are compatible with the depth comparison functions for fragments that have already entered the graphics processing pipeline.

To facilitate this operation, the early depth test circuit 23 includes, as shown in FIG. 2, in addition to the actual "testing" circuit 30, an appropriate controller (control circuit) 28 that is configured to and that operates to determine whether fragments that are to undergo an early depth test to update the depth buffer should undergo the early depth test to update the depth buffer without waiting for any other fragment to complete a depth test or not.

To do this, and again as shown in FIG. 2, the early depth test circuit controller 28 uses a stored "early depth test permission" record 29, that indicates for respective regions of a render output being generated, whether fragments in those regions can undergo early depth tests to update the depth buffer without waiting for any other fragment to undergo a depth test, or not. This early depth test permission record may be stored, for example, in association with the depth and stencil buffers 27, or otherwise stored locally to the early depth test circuit 23, for example in a register(s) of or accessible to the early depth test circuit 23 (e.g. depending upon the size of the early depth test permission record).

FIG. 3 illustrates this operation and shows that when a new fragment reaches the early depth test circuit 23 (step 40), it is first determined which region of the render output the fragment falls within (step 41). This may be determined, for example, from appropriate position and/or region information that is associated with the fragment.

The early depth test circuit controller 28 then determines whether the new fragment is indicated as to undergo an early depth test to update the depth buffer or not (step 42).

If the fragment is not to undergo an early depth test to update the depth buffer, then its processing can be continued (step 44). As discussed above, if the fragment is not to undergo an early depth test at all, then it can simply be passed through the early depth test stage without undergoing an early depth test and its processing continued. Alternatively, the fragment could, if appropriate still be subjected to an early "discard" depth test, before (if appropriate) being passed onwards for further processing.

On the other hand, if the fragment is to undergo an early depth test to update the depth buffer, the early depth test controller 28 then checks the early depth test permission record 29 for the region that the fragment falls within (step 45), and determines therefrom whether the fragment is permitted to undergo the early depth test to update the depth buffer without waiting for another fragment to complete a depth test or not.

When the early depth test permission record for the region that the fragment occupies indicates that the fragment can undergo the early depth test to update the depth buffer without waiting for another fragment to complete a depth test, the early depth test controller 28 triggers the early depth test circuit 30 to perform the early depth test to update the depth buffer on the fragment (step 46). The fragment is then subjected to the early depth test to update the depth buffer, and the depth and stencil buffers 27 updated or not, and the processing of the fragment continued (step 44) or not, in dependence upon the result of that test.

On the other hand, where the early depth test controller 28 determines from the early depth test permission record 29 that the fragment should not undergo the early depth test to update the depth buffer without waiting for another fragment to complete a depth test, then the fragment is caused to wait for another fragment to complete a depth test before it undergoes a depth test to update the depth buffer (step 43). This could be done, e.g., either by stalling the fragment at the early depth test stage until the another fragment that is being waited on has completed its depth test, or by causing the fragment that is to undergo the early depth test to instead skip the early depth test by sending it onwards past the early depth test stage into the shader pipeline 24 (with the fragment then, in an embodiment, being triggered to undergo a late depth test at the late depth test circuit 25 when it reaches that late depth test stage).

As discussed above in relation to FIG. 3, the early depth test controller 28 determines whether a fragment can undergo an early depth test to update the depth buffer based on stored early depth test permission information (record) 29.

In the present embodiment, this early depth test permission record takes the form of a bitmap for respective regions within the render output being generated, with each bit (entry) in the bitmap being set to a particular value (e.g. "1") when fragments within the corresponding region in the render output can be subjected to early depth tests to update the depth buffer without waiting for another fragment to complete a depth test, and being unset (to another value, e.g. "0") when fragments falling within the region of the render output in question should await another fragment completing a depth test before being subjected to a depth test to update the depth buffer.

Figure 4:
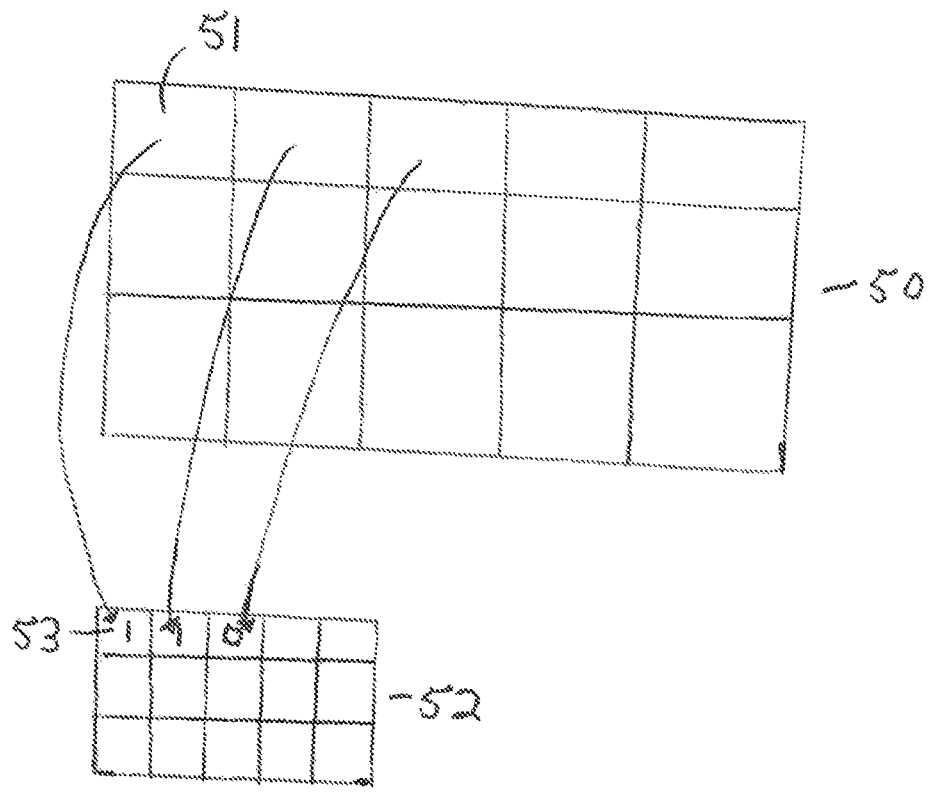
FIG. 4 shows schematically an early depth test permission record that is used in an embodiment of the technology described herein.

FIG. 4 illustrates this and shows an exemplary render output 50 (which in the present embodiments may, for example, be a tile currently being rendered) that is divided into respective regions (areas) 51 (which may, e.g., correspond to individual fragments within the tile, or groups of plural fragments within the tile 50), together with a corresponding early depth test permission record 52 in the form of a bitmap which has a respective entry 53 which can be set or unset for each region 51 of the render output 50.

Figure 5:
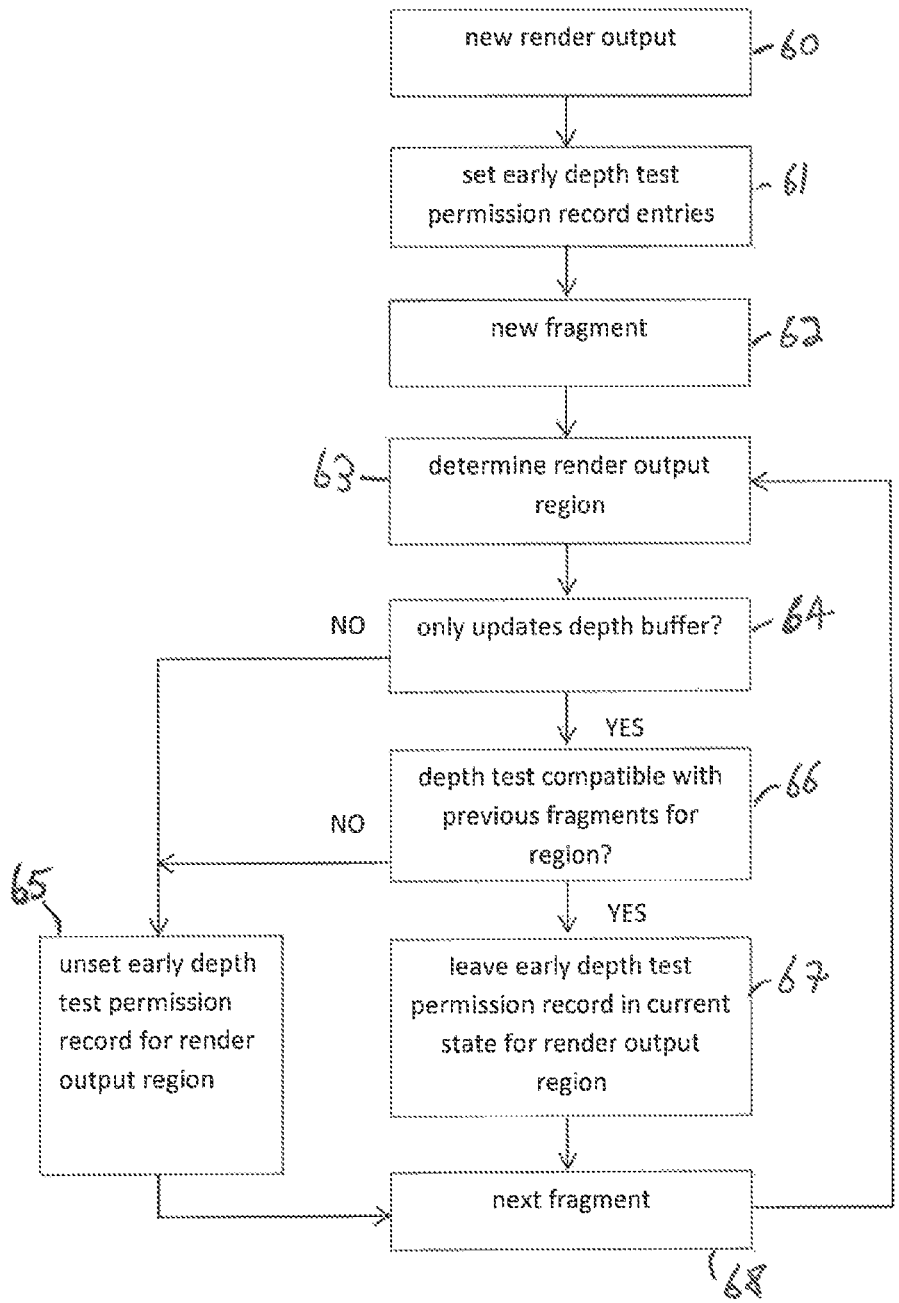
FIG. 5 shows schematically the generation of an early depth test permission record in an embodiment of the technology described herein.

FIG. 5 shows the generation of the early depth test permission record in the present embodiments.

As shown in FIG. 5, when a new render output (e.g. new tile) is started, all the entries in the corresponding early depth test permission record 52 are set to indicate that fragments in the render output can be subjected to early depth tests to update the depth buffer without waiting for another fragment to undergo a depth test (steps 60 and 61). Thus, the early depth test permission record is initialised for a new render output to show that all fragments can undergo early depth tests to update the depth buffer without waiting for other fragments to undergo depth tests.

Then, when a new fragment reaches the early depth test controller (step 62), the render output region that the fragment falls within is determined (step 63). This identifies the early depth test permission record entry that applies to the fragment.

It is then determined whether the new fragment only updates the depth buffer as a result of its depth test or tests (step 64) (if it passes the depth test).

If the new fragment will, if it passes a depth test, do more than only update the depth buffer, then the corresponding early depth test permission record entry for the region of the render output that the new fragment occupies is unset, so as to indicate that the fragments for that region should not undergo early depth tests to update the depth buffer without waiting for other fragments to complete a depth test (step 65).

To do this, in the present embodiment, an early depth test permission record entry for a region is unset to indicate that early depth tests to update the depth buffer cannot be performed out of order (must be performed in the correct rendering order) for the region in question, when a fragment/primitive for a region which any one (or more) of the following conditions applies: the result of late depth test for the fragment/primitive is to be used for outputting (writing) output (e.g. colour) values; the primitive/fragment has side effects; the primitive/fragment has stencil test enabled; or the primitive/fragment is being used for an occlusion query; reaches the early depth test controller 28.

On the other hand, if the new fragment will at most only update the depth buffer if it passes a depth test, it is then determined whether the depth comparison function for the depth test for the new fragment is compatible with the depth comparison functions to be used for the depth tests for any previous fragments that have entered the graphics processing pipeline for the render output region in question (step 66).

In the present embodiments, depth comparison functions for fragments are considered to be compatible when the depth comparison functions are commutative (i.e. the end result (i.e. the final value(s) in the depth buffer) once all the depth tests have been performed would be the same, irrespective of the order in which the individual depth tests are actually carried out) (and correspondingly, if any (outstanding) updates to the values in the depth buffer that would be caused by the depth comparison functions will be monotonic (i.e. such that the depth values in the depth buffer will either never decrease or never increase as a result of the depth comparison tests)).

Thus, in the present embodiments, depth comparison functions are considered to be compatible when they are all from the set: equal to; less than or equal to; and less than; or all from the set: equal to; greater than or equal to; and greater than; (but a less than, or less than or equal to, depth comparison is not considered to be compatible with a greater than, or greater than or equal to, depth comparison (and vice-versa)).

In the present embodiment, it is determined whether primitives/fragments having incompatible depth comparison functions have reached the early depth test controller for the regions of the render output by maintaining "seen" "greater than or greater than or equal to", and "seen" "less than or equal to" records for each region within the render output, with it then being determined that fragments having incompatible depth functions are present for a region of the render output when both the "seen" "greater than or greater than or equal to" and "seen" "less than or less than or equal to" records for a region have been set.

This is done by the early depth test controller also tracking for each respective region within the area of the render output, whether a fragment/primitive that is to undergo the late depth test and having a "greater than" or "greater than or equal to" depth test comparison function has entered the pipeline for that region, and, correspondingly, also, and separately, tracking whether a primitive that has a "less than" or "less than or equal to" depth comparison function has entered the pipeline for that region.

The early depth test controller sets the "seen" "greater than, or greater than or equal to" record for a region when a primitive fragment that has a "greater than" or "greater than or equal to" depth test comparison function for its late depth test reaches the early depth test controller (and correspondingly for the "seen" "less than or less than or equal to" record).

If both the "seen" "greater than or greater than or equal to" and "seen" "less than or less than or equal to" records have been set for a region (i.e. indicating that fragments to undergo the late depth test and having those depth comparison functions have entered the pipeline for the same region), it is determined that fragments having incompatible late depth tests have entered the pipeline for the region.

Thus, the early depth test controller "unsets" an early depth test permission record entry for a region to indicate that any early depth test to update the depth buffer cannot be performed for that region, once (and as soon as) both the "seen" "greater than or greater than or equal to" and "seen" "less than or less than or equal to" records for the region are set (i.e. once a fragment/primitive that sets the second of those records for the region (after one of them has already been set) reaches the early depth test controller).

Thus, when the depth comparison function for the new fragment is not compatible with the depth comparison functions for previous fragments for the render output region in question, then again the early depth test permission record entry for the render output region in question is unset, to indicate that fragments for that region should not undergo early depth tests without waiting for other fragments to complete their depth tests (step 65).

On the other hand, when it is determined at step 66 that the depth test for the new fragment is compatible with the depth tests for the previous fragments, then the early depth test permission record entry for the render output region in question is left in its current state (and so if that record entry is currently "set" to indicate that fragments for the region can undergo early depth tests without waiting for another fragment to undergo a depth test, the early depth test permission record entry will be left in that "set" state, such that fragments for the render output region will still be permitted to undergo early depth tests without waiting for another fragment to undergo a depth test).

The process is then continued for the next fragment from the rasteriser (step 68), and so on, until the render output has been completed.

It will be appreciated from the above that in the present embodiments, the early depth test permission record will initially be set to indicate that the early depth test to update the depth buffer can be performed "out of order" for all the render output regions, but a record entry will then be "unset" to indicate that the early depth tests to update the depth buffer can't be performed "out of order" for a render output region once a fragment that has an incompatible depth comparison function or that produces an output other than solely updating the depth buffer from the late depth test (if it passes) has entered the graphics processing pipeline for the region in question, and once the record entry for a render output region is unset, then the record entry is left unset for the remainder of the generation of the render output in question.

Thus, following the start of the generation of the render output, for each render output region, any early depth tests to update the depth buffer will be done "out of order", until the first fragment having an incompatible depth comparison function or that does more than solely update the depth buffer (etc.) as a result of its late depth test enters the pipeline for the render output region, with any further fragments for that render output region that are to undergo the early depth test to update the depth buffer thereafter then awaiting any earlier fragment that is already in the graphics processing pipeline to complete its late depth test before undergoing a depth test to update the depth buffer.

Although FIG. 4 shows maintaining an early depth permission record for plural regions of a render output, it would, if desired, be possible to maintain a (single) record simply for the render output as a whole.

In this case, when the generation of a render output is started, the graphics processor will operate to perform any early depth tests to update the depth buffer for fragments for the render output "out of order", until the first fragment that is to undergo a late depth test and having an incompatible depth comparison function or that does more than solely update the depth buffer (etc.) as a result of its late depth test enters the pipeline. In other words, the graphics processor will, when it starts to generate the render output, in effect, operate in an early depth test "out of order" mode, but then revert to an "in order" depth testing mode once an incompatible fragment has entered the graphics processing pipeline.

It can be seen from the above that the technology described herein, in its embodiments at least, provides a mechanism for more efficiently performing hidden surface removal in a graphics processing system.

This is achieved, in the embodiments of the technology described herein at least, by allowing graphics fragments to be subjected to an early depth test to update the depth buffer "out of order", where it can be determined that it is "safe" to do so.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor that includes:
   a rasteriser circuit configured to rasterise input primitives to generate graphics fragments to be processed, each graphics fragment having one or more sampling positions associated with it;
   a renderer circuit configured to process fragments generated by the rasteriser circuit to generate output fragment data;
   an early depth test circuit configured to perform an early depth test on fragments generated by the rasteriser circuit before the fragments are sent to the renderer circuit for processing;
   a late depth test circuit configured to perform a late depth test on the fragments that have been processed by the renderer circuit before the fragments are output by the renderer circuit to provide output fragment data for sampling positions associated with the fragments; and
   a depth buffer configured to store depth data values for use by the early and late depth test circuits;
   the method comprising:
   for a first fragment generated by the rasteriser circuit that is to undergo the early depth test and that will update the depth buffer if it passes the early depth test:
   determining whether the first fragment should undergo the early depth test to update the depth buffer without waiting for a second fragment to undergo a depth test, or whether a result of the late depth test on the second fragment that is still to undergo the late depth test should be awaited before performing the depth test to update the depth buffer on the first fragment; and
   when it is determined that the first fragment should undergo the early depth test to update the depth buffer without waiting for the second fragment to undergo the depth test, performing the early depth test to update the depth buffer for the first fragment and when the first fragment passes the early depth test, updating the depth buffer with the depth data for the first fragment, and when the first fragment fails the early depth test, not updating the depth buffer with the depth data for the first fragment; and
   when it is determined that the result of the late depth test on the second fragment that is still to undergo the late depth test should be awaited before performing the depth test to update the depth buffer on the first fragment, only performing the depth test to update the depth buffer for the first fragment once the second fragment that is still to undergo the late depth test has completed its late depth test.

2. The method of claim 1, wherein determining whether the first fragment should undergo the early depth test to update the depth buffer without waiting for a second fragment to undergo the depth test, or whether the result of the late depth test on the second fragment that is still to undergo the late depth test should be awaited before performing the depth test to update the depth buffer on the first fragment comprises:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is no second fragment in the graphics processing pipeline that could overlap at least in part with the position of the first fragment that is to undergo the early depth test to update the depth buffer, determining that the first fragment that is to undergo the early depth test to update the depth buffer can undergo the early depth test to update the depth buffer without waiting for the second fragment to undergo the depth test.

3. The method of claim 1, wherein determining whether the first fragment should undergo the early depth test to update the depth buffer without waiting for a second fragment to undergo the depth test, or whether the result of the late depth test on the second fragment that is still to undergo the late depth test should be awaited before performing the depth test to update the depth buffer on the first fragment comprises:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is a second fragment in the graphics processing pipeline that could overlap at least in part with the position of the first fragment that is to undergo the early depth test to update the depth buffer:

determining whether the second fragment that is already in the graphics processing pipeline and that is still to undergo the late depth test will, if it passes the late depth test, only update the depth buffer; and when it is determined that the second fragment that is already in the graphics processing pipeline and that is still to undergo the late depth test will, if it passes that late depth test, other than only update the depth buffer:

determining that the first fragment that is to undergo the early depth test to update the depth buffer should await the second fragment that is already in the graphics processing pipeline completing its late depth test before undergoing the depth test to update the depth buffer.

4. The method of claim 1, wherein determining whether the first fragment should undergo the early depth test to update the depth buffer without waiting for a second fragment to undergo the depth test, or whether the result of the late depth test on the second fragment that is still to undergo the late depth test should be awaited before performing the depth test to update the depth buffer on the fragment comprises:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is a second fragment in the graphics processing pipeline that could overlap at least in part with the position of the first fragment that is to undergo the early depth test to update the depth buffer:

determining whether the second fragment that is already in the graphics processing pipeline and that is still to undergo the late depth test will, if it passes the late depth test, only update the depth buffer; and when it is determined that the second fragment that is already in the graphics processing pipeline and that is still to undergo the late depth test will, if it passes the late depth test, only update the depth buffer:

determining whether a depth comparison function to be used for the depth test for the second fragment in the graphics processing pipeline that could overlap at least in part with the position of the first fragment that is to undergo the early depth test to update the depth buffer and that are still to undergo the late depth test and a depth comparison function to be used for the early depth test to update the depth buffer for the first fragment that is to undergo the early depth test to update the depth buffer are commutative with each other or not, and/or whether the changes that could be caused to the depth buffer by the depth tests for those fragments are monotonic or not; and when it is determined that the depth comparison function to be used for the depth test for the second fragment in the graphics processing pipeline that could overlap at least in part with the position of the first fragment that is to undergo the early depth test to update the depth buffer and that is still to undergo the late depth test and the depth comparison function to be used for the early depth test to update the depth buffer for the first fragment that is to undergo the early depth test to update the depth buffer are commutative with each other, and/or that the changes that could be caused to the depth buffer by the depth tests for those fragments are monotonic:

determining that the first fragment that is to undergo the early depth test to update the depth buffer can undergo the early depth test to update the depth buffer without waiting for the second fragment to undergo the depth test.

5. The method of claim 1, comprising keeping a record for one or more regions within a render output of whether fragments for the respective regions can be early depth-tested to update the depth buffer without waiting for any other fragment to undergo a depth test or not.

6. The method of claim 5, comprising:

initially setting a record entry for a region in the render output to indicate that fragments for the region can be early depth-tested to update the depth buffer without waiting for any other fragment to undergo the depth test; and changing the record entry for the region in the render output to indicate that fragments for the region that are to be early depth-tested to update the depth buffer must await the result of the late depth test on the fragment that is still to undergo the late depth test before undergoing the depth test to update the depth buffer:
once the first fragment enters the graphics processing pipeline for the region for which:
a depth comparison function to be used for the first fragment is other than commutative with a depth comparison function to be used for the depth test for the second fragment in the graphics processing pipeline for the region in the render output; or
the change that could be caused to the depth buffer by the depth comparison function to be used for the first fragment is other than monotonic with the change that could be caused to the depth buffer by the depth comparison function to be used for the depth test for the second fragment in the graphics processing pipeline for the region in the render output; or
the result of the late depth test on the second fragment is to be used for other than solely updating the depth buffer.

7. The method of claim 5, comprising keeping a single record for the render output as a whole.

8. The method of claim 1, comprising tracking for each of one or more regions in a render output, the depth test comparison functions of fragments that enter the graphics processing pipeline for the regions.

9. The method of claim 1, comprising:
when generating a render output:
initially early depth testing fragments for the render output that are to be early depth-tested to update the depth buffer without waiting for any other fragment to undergo the depth test;
until the first fragment enters the graphics processing pipeline for which:
a depth comparison function to be used for the first fragment is other than commutative with a depth comparison function to be used for the depth tests for a second fragment for the render output; or
the change that could be caused to the depth buffer by the depth comparison function to be used for the first fragment is other than monotonic with the change that could be caused to the depth buffer by the depth comparison function to be used for the depth test for the second fragment for the render output; or
the result of the late depth test for the second fragment is to be used for other than solely updating the depth buffer; and
thereafter making any fragments for the render output that are to be early depth-tested to update the depth buffer await the result of the late depth test on the second fragment that is still to undergo the late depth test before undergoing the depth test to update the depth buffer.

10. The method of claim 1, comprising
when it is determined that the result of the late depth test on the second fragment that is still to undergo the late depth test should be awaited before performing the depth test to update the depth buffer on the first fragment that is to undergo the early depth test to update the depth buffer, only performing the depth test to update the depth buffer for the first fragment that is to undergo the early depth test to update the depth buffer once the second fragment that is still to undergo the late depth test has completed its late depth test by one of:
stalling the first fragment that is to undergo the early depth test at the early depth test stage until the second fragment that is still to undergo the late depth test has completed its late depth test, and then subjecting the first fragment that is to undergo the early depth test to the early depth test thereafter; and
sending the first fragment that is to undergo the early depth test to update the depth buffer onwards for processing past the early depth test without subjecting it to the early depth test, and subjecting the first fragment that was to undergo the early depth test to the late depth test instead.

11. A graphics processor, the graphics processor comprising:
a rasteriser circuit configured to rasterise input primitives to generate graphics fragments to be processed, each graphics fragment having one or more sampling positions associated with it;
a renderer circuit configured to process fragments generated by the rasteriser circuit to generate output fragment data;
an early depth test circuit configured to perform an early depth test on fragments generated by the rasteriser circuit before the fragments are sent to renderer circuit for processing;
a late depth test circuit configured to perform a late depth test on the fragments that have been processed by the renderer circuit before the fragments are output by the renderer circuit to provide output fragment data for sampling positions associated with the fragments; and
a depth buffer configured to store depth data values for use by the early and late depth tests;
wherein the early depth test circuit is further configured to:
for a first fragment generated by the rasteriser circuit that is to undergo the early depth test and that will update the depth buffer if it passes the early depth test:
determine whether the first fragment should undergo the early depth test to update the depth buffer without waiting for a second fragment to undergo a depth test, or whether the result of the late depth test on the second fragment that is still to undergo the late depth test should be awaited before performing the depth test to update the depth buffer on the first fragment; and
when it is determined that the first fragment should undergo the early depth test to update the depth buffer without waiting for the second fragment to undergo the depth test, perform the early depth test to update the depth buffer for the first fragment and when the first fragment passes the early depth test, update the depth buffer with the depth data for the first fragment, and when the first fragment fails the early depth test, not update the depth buffer with the depth data for the first fragment;
and wherein the graphics processor is further configured to:
when it is determined that the result of the late depth test on the second fragment that is still to undergo the late depth test should be awaited before performing the depth test to update the depth buffer on the first fragment, only perform the depth test to update the depth buffer for the first fragment once the second fragment that is still to undergo the late depth test has completed its late depth test.

12. The graphics processor of claim 11, wherein the early depth test circuit is configured to determine whether the first fragment should undergo the early depth test to update the depth buffer without waiting for the second fragment to undergo the depth test, or whether the result of the late depth test on the second fragment that is still to undergo the late depth test should be awaited before performing the depth test to update the depth buffer on the first fragment by:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is no second fragment in the graphics processing pipeline that could overlap at least in part with the position of the first fragment that is to undergo the early depth test to update the depth buffer, determining that the first fragment that is to undergo the early depth test to update the depth buffer can undergo the early depth test to update the depth buffer without waiting for the second fragment to undergo the depth test.

13. The graphics processor of claim 11, wherein the early depth test circuit is configured to determine whether the first fragment should undergo the early depth test to update the depth buffer without waiting for a second fragment to undergo the depth test, or whether the result of the late depth test on the second fragment that is still to undergo the late depth test should be awaited before performing the depth test to update the depth buffer on the first fragment by:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is a second fragment in the graphics processing pipeline that could overlap at least in part with the position of the first fragment that is to undergo the early depth test to update the depth buffer:

determining whether the second fragment that is already in the graphics processing pipeline and that is still to undergo the late depth test will, if it passes the late depth test, only update the depth buffer; and when it is determined that the second fragment that is already in the graphics processing pipeline and that is still to undergo the late depth test will, if it passes the late depth test, other than only update the depth buffer:

determining that the first fragment that is to undergo the early depth test to update the depth buffer should await the second fragment that is already in the graphics processing pipeline completing its late depth test before undergoing the depth test to update the depth buffer.

14. The graphics processor of claim 11, wherein the early depth test circuit is configured to determine whether the first fragment should undergo the early depth test to update the depth buffer without waiting for a second fragment to undergo the depth test, or whether the result of the late depth test on the second fragment that is still to undergo the late depth test should be awaited before performing the depth test to update the depth buffer on the first fragment by:

determining whether there is a second fragment that is already in the graphics processing pipeline after the early depth test that is still to undergo the late depth test, and that could overlap, at least in part, with the first fragment that is to undergo the early depth test to update the depth buffer; and when it is determined that there is a second fragment in the graphics processing pipeline that could overlap at least in part with the position of the first fragment that is to undergo the early depth test to update the depth buffer:

determining whether the second fragment that is already in the graphics processing pipeline and that is still to undergo the late depth test will, if it passes the late depth test, only update the depth buffer; and when it is determined that the second fragment that is already in the graphics processing pipeline and that is still to undergo the late depth test will, if it passes the late depth test, only update the depth buffer:

determining whether a depth comparison function to be used for the depth test for the second fragment in the graphics processing pipeline that could overlap at least in part with the position of the first fragment that is to undergo the early depth test to update the depth buffer and that are still to undergo the late depth test and a depth comparison function to be used for the early depth test to update the depth buffer for the first fragment that is to undergo the early depth test to update the depth buffer are commutative with each other or not, and/or whether the changes that could be caused to the depth buffer by the depth tests for those fragments are monotonic or not; and when it is determined that the depth comparison function to be used for the depth test for the second fragment in the graphics processing pipeline that could overlap at least in part with the position of the first fragment that is to undergo the early depth test to update the depth buffer and that is still to undergo the late depth test and the depth comparison function to be used for the early depth test to update the depth buffer for the first fragment that is to undergo the early depth test to update the depth buffer are commutative with each other, and/or that the changes that could be caused to the depth buffer by the depth tests for those fragments are monotonic:

determining that the first fragment that is to undergo the early depth test to update the depth buffer can undergo the early depth test to update the depth buffer without waiting for the second fragment to undergo the depth test.

15. The graphics processor of claim 11, further comprising a processing circuit configured to keep a record for one or more regions within a render output of whether fragments for the respective regions can be early depth-tested to update the depth buffer without waiting for any other fragment to undergo a depth test or not.

16. The graphics processor of claim 15, wherein the processing circuit is further configured to keep a single record for the render output as a whole.

17. The graphics processor of claim 11, wherein the processing circuit is further configured to track for each of one or more regions in a render output, the depth test comparison functions of fragments that enter the graphics processing pipeline for the regions.

18. The graphics processor of claim 15, wherein the processing circuit is further configured to:

initially set a record entry for a region in the render output to indicate that fragments for the region can be early depth-tested to update the depth buffer without waiting for any other fragment to undergo the depth test; and change the record entry for the region in the render output to indicate that fragments for the region that are to be early depth-tested to update the depth buffer must await the result of the late depth test on the fragment that is still to undergo the late depth test before undergoing a depth test to update the depth buffer:

once the first fragment enters the graphics processing pipeline for the region for which:

a depth comparison function to be used for the first fragment is other than commutative with a depth comparison function to be used for the depth test for the second fragment in the graphics processing pipeline for the region in the render output; or the change that could be caused to the depth buffer by the depth comparison function to be used for the first fragment is other than monotonic with the change that could be caused to the depth buffer by the depth comparison function to be used for the depth test for the second fragment in the graphics processing pipeline for the region in the render output; or the result of the late depth test for the second fragment is to be used for other than solely updating the depth buffer.

19. The graphics processor of claim 11, wherein the graphics processor is configured to:

when generating a render output:

initially early depth test fragments for the render output that are to be early depth-tested to update the depth buffer without waiting for any other fragment to undergo the depth test;

until the first fragment enters the graphics processing pipeline for which:

a depth comparison function to be used for the first fragment is other than commutative with a depth comparison function to be used for the depth test for any earlier fragments for the render output; or the change that could be caused to the depth buffer by a depth comparison function to be used for the first fragment is other than monotonic with the change that could be caused to the depth buffer by the depth comparison function to be used for the depth test for the second fragment for the render output; or the result of the late depth test for the second fragment is to be used for other than solely updating the depth buffer; and thereafter make any fragments for the render output that are to be early depth-tested to update the depth buffer await the result of the late depth test on the second fragment that is still to undergo the late depth test before undergoing the depth test to update the depth buffer.

20. The graphics processor of claim 11, wherein the graphics processor comprises processing circuitry configured to only perform the depth test to update the depth buffer for the first fragment that is to undergo the early depth test to update the depth buffer once the second fragment that is still to undergo the late depth test has completed its late depth test when it is determined that the result of the late depth test on the second fragment that is still to undergo the late depth test should be awaited before performing the depth test to update the depth buffer on the first fragment that is to undergo the early depth test, by one of:

stalling the first fragment that is to undergo the early depth test at the early depth test stage until the second fragment that is still to undergo the late depth test has completed its late depth test, and then subjecting the first fragment that is to undergo the early depth test to the early depth test thereafter; and sending the first fragment that is to undergo the early depth test to update the depth buffer onwards for processing past the early depth test without subjecting it to the early depth test, and subjecting the first fragment that was to undergo the early depth test to the late depth test instead.

21. A non-transitory computer readable storage medium comprising computer software code which when executing on a processor performs a method of operating a graphics processor that includes:

a rasteriser circuit configured to rasterise input primitives to generate graphics fragments to be processed, each graphics fragment having one or more sampling positions associated with it;

a renderer circuit configured to process fragments generated by the rasteriser circuit to generate output fragment data;

an early depth test circuit configured to perform an early depth test on fragments generated by the rasteriser circuit before the fragments are sent to the renderer circuit for processing;

a late depth test circuit configured to perform a late depth test on the fragments that have been processed by the renderer circuit before the fragments are output by the renderer circuit to provide output fragment data for sampling positions associated with the fragments; and a depth buffer configured to store depth data values for use by the early and late depth test circuits;

the method comprising:

for a first fragment generated by the rasteriser circuit that is to undergo the early depth test and that will update the depth buffer if it passes the early depth test:

determining whether the first fragment should undergo the early depth test to update the depth buffer without waiting for a second fragment to undergo a depth test, or whether a result of the late depth test on the second fragment that is still to undergo the late depth test should be awaited before performing the depth test to update the depth buffer on the first fragment; and when it is determined that the first fragment should undergo the early depth test to update the depth buffer without waiting for the second fragment to undergo the depth test, performing the early depth test to update the depth buffer for the first fragment and when the first fragment passes the early depth test, updating the depth buffer with the depth data for the first fragment, and when the first fragment fails the early depth test, not updating the depth buffer with the depth data for the first fragment; and when it is determined that the result of the late depth test on the second fragment that is still to undergo the late depth test should be awaited before performing the depth test to update the depth buffer on the first fragment, only performing the depth test to update the depth buffer for the first fragment once the second fragment that is still to undergo the late depth test has completed its late depth test.

* * * * *